(12) United States Patent
Reinhard et al.

(10) Patent No.: US 7,606,933 B2
(45) Date of Patent: Oct. 20, 2009

(54) SHARED MEMORY AND HIGH PERFORMANCE COMMUNICATION USING INTERCONNECT TUNNELING

(75) Inventors: Walter James Reinhard, Coquitlam (CA); Igor Gorodetsky, Coquitlam (CA)

(73) Assignee: Cray Canada Corporation, Burnaby (CA)

( * ) Notice: Subject to any disclaimer, the term of this patent is extended or adjusted under 35 U.S.C. 154(b) by 910 days.

(21) Appl. No.: 10/775,101

(22) Filed: Feb. 11, 2004

(65) Prior Publication Data

US 2005/0188105 A1 Aug. 25, 2005

(51) Int. Cl.
*G06F 15/173* (2006.01)

(52) U.S. Cl. ............... 709/238; 709/201; 709/216; 709/250; 709/249; 709/218; 709/230; 709/236; 370/392; 370/393; 370/396

(58) Field of Classification Search ............... 709/238, 709/218, 230, 236, 201, 216, 250, 249; 710/112, 710/100, 305, 310; 370/393, 392, 396
See application file for complete search history.

(56) References Cited

U.S. PATENT DOCUMENTS

| | | | | |
|---|---|---|---|---|
| 4,287,592 | A * | 9/1981 | Paulish et al. | 370/403 |
| 6,148,349 | A * | 11/2000 | Chow et al. | 710/33 |
| 6,892,298 | B2 * | 5/2005 | West | 713/2 |
| 6,915,371 | B1 * | 7/2005 | Berndt et al. | 710/310 |
| 6,944,617 | B2 * | 9/2005 | Harriman | 707/100 |
| 6,973,484 | B1 * | 12/2005 | Singhal et al. | 709/216 |
| 6,996,651 | B2 * | 2/2006 | Garinger et al. | 710/305 |
| 7,006,489 | B2 * | 2/2006 | Li et al. | 370/352 |
| 7,024,613 | B2 * | 4/2006 | Carnevale et al. | 714/763 |
| 7,046,668 | B2 * | 5/2006 | Pettey et al. | 370/392 |
| 7,174,467 | B1 * | 2/2007 | Helms et al. | 713/300 |
| 2001/0014097 | A1 | 8/2001 | Beck et al. | |
| 2002/0198927 | A1 | 12/2002 | Craddock et al. | |
| 2003/0081605 | A1 * | 5/2003 | Egevang | 370/392 |

OTHER PUBLICATIONS

Search Report for UK Patent Application No. GB0502831.1, UK Patent Office, May 31, 2005.

* cited by examiner

*Primary Examiner*—Nathan J Flynn
*Assistant Examiner*—Mohammad A Siddiqi
(74) *Attorney, Agent, or Firm*—Oyers Wiggs Green & Mutala LLP

(57) ABSTRACT

A high performance computer system has a number of compute nodes interconnected by an inter-node communication network. Each compute node has a local packetized interconnect coupled to the inter-node communication network by an interface. Data packets on the local packetized interconnect of a sending node may be delivered to a destination in a receiving node by addressing them to addresses associated with the network interface and tunneling the packets through the inter-node communication network to the receiving node.

44 Claims, 15 Drawing Sheets

SHARED MEMORY AND HIGH PERFORMANCE COMMUNICATION USING INTERCONNECT TUNNELING

TECHNICAL FIELD

This invention relates to data communication networks. The invention has particular application to internal communication networks of multiprocessor computers.

BACKGROUND

Multiprocessor, high performance computers are often used to solve large complex problems. FIG. 1 shows a typical multiprocessor computer system 10 which has a number of compute nodes 12 connected by a communication network 14. In the example embodiment shown in FIG. 2, each compute node (e.g. 12A) includes a CPU 15, a memory 17, and a network interface 18 joined together by a system interconnect (or "system bus") 16.

To expedite the completion of computational problems, most applications designed to run on such computers split large problems up into smaller sub-problems. Each sub-problem is assigned to one of the compute nodes. Since there are a large number of compute nodes, many sub-problems can be worked on simultaneously. A program is executed on each of CPUs 15 to solve the part of the large problem assigned to that CPU. Each instance of the executing program may be referred to as a process. All of the processes execute concurrently and may communicate with each other.

Some problems cannot be split up into sub-problems which can be completed independently of one another. For example, the completion of some sub-problems may require intermediate results from other sub-problems. In such cases an application process must communicate with other application processes that are solving related sub-problems to exchange intermediate results.

Communication between processes solving related sub-problems often requires the repeated exchange of data. Such data exchanges occur frequently and communication performance in terms of bandwidth, and especially latency, are a concern. The overall performance of many high performance computer applications is highly dependent on communication latency.

Low latency communication between CPUs is implemented using one of two paradigms: messaging and shared memory. Messaging is used in computer systems having distributed memory architectures. In such computer systems each compute node has its own separate memory. A communication network connects the compute nodes together. For example, multiprocessor computer 10 in FIGS. 1 and 2 has a distributed memory architecture. Messaging involves sharing data by sending messages from one compute node to another by way of the communication network.

If a computer system directly implements, or emulates, memory sharing between compute nodes, data can be communicated by way of the shared memory. Some computers directly implement shared memory in hardware. Hardware-based shared memory systems are very difficult to implement in computer systems having more than about 64 compute nodes. Larger computer systems, which have hundreds or thousands of CPUs almost exclusively use distributed memory. In these systems, shared memory can be emulated on top of messaging, but performance is only marginally satisfactory.

Low-latency messaging can be implemented in a variety of ways. The "rendezvous protocol" is well suited for large messages. To avoid computationally expensive memory-to-memory copies, the rendezvous protocol copies messages directly from an application buffer in the sender's memory to an application buffer in the receiver's memory. To achieve this, the sender must learn the address of the receiver's application buffer. The sender engages in an interaction (referred to as a rendezvous) with the receiver. The sender sends a short message indicating that it wants to send a large message to the receiver. The receiver identifies an application buffer and responds with a short message indicating it is ready to receive the large message and the address of a suitable application buffer. The sender sends the large message to the receiver where it is stored in the receiving application's buffer. The sender finishes by sending another short message to the receiver indicating that it has completed the message transmission.

The "eager protocol" is suited for small messages and avoids the interaction overhead of the rendezvous protocol. Using the eager protocol, the sender sends the message to the receiver. The message is received into a temporary buffer. When the receiver is ready to receive the message, and an appropriate application buffer has been identified, the received message is copied from the temporary buffer to the application buffer. The eager protocol has the disadvantage of requiring a memory-to-memory copy at the receiver. For short messages the computational cost of this copy is less than the overhead of the rendezvous protocol.

To appreciate this invention, it is useful to understand how messaging is implemented at the sender and receiver. In a sending compute node 12A, network interface 18A is used to communicate with receiving compute node 12B. At the receiving compute node 12B, network interface 18B is used for communication with sending compute node 12A. Network interfaces 18A and 18B each provide control and data registers that are mapped into the memory address spaces of CPUs 15A and 15B respectively. The CPUs use the control and data registers to control communication.

Suppose that a process running on CPU 15A needs to make some data, which is in memory 17A, available to a process running on CPU 15B in the typical prior art computer system of FIGS. 1 and 2. Sending CPU 15A writes into the control and data registers of network interface 18A to send a message. There are two methods of doing this. In either method, CPU 15A writes the identity of the receiving compute node 12B into the control registers. If CPU 15A knows the destination address in receiving memory 17B, the destination address is written to the control registers of network interface 18A. Under the first method of sending a message, CPU 15A reads the message out of memory 17A under software control and writes the message into the data registers of network interface 18A.

Under the second method of sending a message, CPU 15A writes the address of the message in sending memory 17A into the control registers of network interface 18A. Network interface 18A uses a direct memory access (DMA) capability to transfer the message from sending memory 17A to network interface 18A. In both methods, network interface 18A constructs one or more packets containing the message and sends the packets via communication network 14 to receiving compute node 12B.

In modern high performance computers, the second method is used. This is predominantly because it allows CPU 15A to proceed with other work while the message is being transferred from memory 17A to network interface 18A. Under both methods, sending a message requires one or more writes to control registers of network interface 18A and the transfer of the message from memory to the network interface.

In a prior art computer, receiving CPU 15B is either interrupted by network interface 18B when a message arrives or CPU 15B continuously polls network interface 18B to detect when a message has arrived. Once CPU 15B learns that a message has arrived, it may write and read the control registers of network interface 18B to determine the size of the received message. CPU 15B can use either of two methods to transfer the received message to memory 17B.

In the first method, CPU 15B reads the message out of the data registers of network interface 18B and copies the message to a message buffer in memory 17B. In the second method, CPU 15B writes the address of a message buffer in receiving memory 17B to the control registers of network interface 18B. Network interface 18B uses a DMA capability to transfer the message to memory 17B. It can be seen that receiving a message requires one or more writes and possibly reads to control registers of network interface 18B and the transfer of the message from network interface 18B to memory 17B.

Until recently, most computer systems used system interconnects consisting of parallel address and data buses (e.g. PCI, PCI-X) to provide communication among CPUs, memory and peripherals. In such interconnects, the address buses typically have 32 or 64 signal lines. The data buses typically have 32, 64, or 128 signal lines. In some lower-performance systems, the address and data buses share the same signal lines. Providing such address and data buses requires the provision of 64 to 192 signal traces on circuit boards between the CPU, memory, and peripherals.

To read a data value from memory or a peripheral, a CPU drives an address value on to the address bus, waits for a short period of time, and reads a data value off the data bus. To write a data value to memory or a peripheral, a CPU simultaneously drives an address value on to the address bus and a data value on to the data bus.

Over the years, performance gains have been achieved by increasing the speed of the address and data buses. However, it is increasingly difficult to operate parallel buses at higher speeds. Signal skew and signal reflections on the various signal lines of the bus and crosstalk between signal lines are limiting the speeds at which parallel buses can be driven. Signal skew results from signals traveling on unequal signal trace lengths, signal interference, etc. Signal reflections result from the presence of imperfectly impedance-matched connectors located part way along the signal lines.

Because the signal lines of traditional buses are used in a half duplex mode to transfer data in both directions, it is necessary to insert wasted clock cycles to allow signals in one direction to die down before the bus is used in the other direction. Many such buses also have a bus mastership component which provides entities on the bus with the ability to request and be granted the privilege of initiating read or write operations on the bus.

In the last few years, parallel address and data buses have been supplanted by parallel interconnects having a reduced number of signal lines and serial interconnects. Examples of such interconnects are HyperTransport™ (see, for example, HyperTransport I/O Link Specification, available from the HyperTransport Consortium, http://www.hypertransport.org/) RapidIO™ (see, for example, RapidIO Interconnect Specification; RapidIO Interconnect GSM Logical Specification; RapidIO Serial Physical Layer Specification; and, RapidIO System and Device Interoperability Specification, available from the RapidIO Trade Association, http://www.rapidio.org/) and PCI Express™ (see, for example PCI Express Base Specification; PCI Express Card Electromechanical Specification; and, PCI Express Mini Card Specification available from PCI-SIG, http://www.pcisig.com/). Such interconnects use fewer signal lines, careful matching of signal line lengths, and other improvements to drive signals further at speeds higher than are readily practical on wide parallel buses. Such interconnects are configured as properly-terminated point to point links that are no longer shared in order to avoid signal reflections. To avoid the delays associated with bus reversal of a half duplex bus, these interconnects use separate signal lines for the two directions of data transfer. Both types of interconnects operate at data rates that exceed 300 MBps (megabytes per second). The serial interconnects use Low Voltage Differential Signaling (LVDS) to achieve higher data rates and reduced electromagnetic interference (EMI).

Because the number of signal lines is typically less than the width of data being transferred, it is not possible to transfer a complete block of data in a single clock cycle. Instead, both types of interconnect package and transfer data in the form of packets.

The term "packetized interconnect" is used herein to refer collectively to interconnects which package and transfer data in the form of packets. Packetized interconnects may use parallel data paths which have fewer signal lines than a width of data being transferred or serial data paths.

Despite being packetized, packetized interconnects base data transfer on memory-access semantics. "Packetized interconnects" as used herein are distinct from communication links which use packet-based data communication protocols (e.g. TCP/IP) that lack memory access semantics.

Read request packets contain an address and number of bytes to be fetched. Read response packets return the requested data. Write request packets contain an address and data bytes to be written. Write confirmation packets optionally acknowledge the completion of a write. Beyond the basic operations of reading and writing, most packetized interconnects include more advanced operations. These include the atomic read-modify-write operation amongst others. Terminology differs between the various interconnect technologies.

Packetized interconnects use memory address ranges associated with memory and peripherals. Address ranges assigned to peripherals are used to access control and data registers. Unlike parallel buses, packetized interconnects use assigned address ranges to route packets to memory or a peripheral where the read, write, or other operation will be performed.

Memory of types commonly available does not directly support packetized interconnects. Instead a packetized interconnect terminates at a memory controller which places data from packets received by way of the packetized interconnect into a traditional parallel bus (e.g. SDRAM, DDR, RDRAM bus) for communication to the memory.

Because of the high speeds at which packetized interconnects operate, they are usually restricted to a physical operating region that is not much greater than a few meters in length. A signal propagating over signal lines longer than this length will degrade too much to be useful. As typically used, a packetized interconnect ties together the CPU(s), memory, and peripherals in a single compute node of a multiprocessor computer. Other communication technologies (e.g. Ethernet and TCP/IP, InfiniBand™) are used to communicate between compute nodes.

The inventors have realized that InfiniBand™ and similar technologies have many of the attributes of a packetized interconnect, but can carry data over distances which are somewhat longer (e.g. tens of meters) than can packetized interconnects. InfiniBand™ would be an undesirably complicated protocol to implement directly in a CPU, memory, and peripherals. InfiniBand™ is capable of acting either as a packetized interconnect or as a communication technology between compute nodes.

To send or receive a message in a modern multiprocessor computer that uses a packetized interconnect, the CPU issues read or write request packets to read or write network interface control registers. The network interface returns read response packets and possibly write confirmation packets. Message transfers between memory and the network interface similarly involve the use of packetized read or write operations.

CPU 15A uses a packetized interconnect to pass a message to network interface 18A. CPU 15A typically executes software which includes a driver for network interface 18A. The driver software may at least partially prepare some communication network packet headers (e.g. TCP and IP packet headers) and pass those headers with the application payload in the message. Upon receipt of the message, network interface 18A, strips the packetized interconnect packet headers from the message, adds any additional packet headers required by communication network 14 (e.g. an Ethernet header), and may update the communication network packet headers provided by CPU 15A (e.g. compute and write an appropriate checksum in the IP header). At network interface 18B, the process is reversed. Interface 18B inserts some or all of the received communication network packet into a packetized interconnect packet and forwards the packetized interconnect packet to memory 17B.

In high performance computing, communication latency is such a concern that it is important to reduce latency as much as possible. End to end latencies are typically 1 to 5 microseconds in modern high performance computers. Reducing end to end latency by 50-100 nanoseconds has a measurable impact on application performance. The inventors have discovered that control register operations and the conversion of messages between packetized interconnect packets and communication network packets can cause delays of these magnitudes.

There is a need to provide computer systems which achieve low-latency communications between compute nodes.

SUMMARY OF THE INVENTION

An aspect of this invention provides a method for exchanging data between compute nodes of a computer system. The computer system has a plurality of compute nodes interconnected by an inter-node communication network. Each of the compute nodes has an independent address space and comprises: a local packetized interconnect; a network interface coupled to the local packetized interconnect and the inter-node communication network; at least one data processor coupled to the local packetized interconnect; and, a memory system coupled to the local packetized interconnect. The method comprises associating a first range of addresses in an address space of a sending one of the compute nodes with the network interface of the sending compute node and, at the network interface associating the first range of addresses with the receiving compute node. The method involves tunneling data from the sending compute node to the receiving compute node by: placing a packet addressed to an address in the first range of addresses on the local packetized interconnect of the sending compute node; receiving the local packetized interconnect packet at the network interface of the sending compute node; encapsulating the local packetized interconnect packet in an inter-node communication network packet addressed to the receiving compute node; and, dispatching the inter-node communication network packet to the receiving compute node by way of the inter-node communication network.

Other aspects of the invention provide computer systems which include mechanisms for tunneling data between compute nodes. One other aspect of the invention provides a multiprocessor computer system comprising a plurality of compute nodes interconnected by an inter-node communication network. Each of the compute nodes has an independent address space and comprises: a local packetized interconnect; a network interface coupled to the local packetized interconnect and the inter-node communication network; at least one data processor coupled to the local packetized interconnect; and, a memory system coupled to the local packetized interconnect. The network interface of a sending one of the compute nodes maintains an association between a first range of addresses in an address space of the sending compute node with a receiving one of the compute nodes and the network interface of the sending compute node is configured to: receive on the local packetized interconnect packets addressed to an address in the first range of addresses; encapsulate the packets in inter-node communication network packets addressed to the receiving compute node; and, dispatching the inter-node communication network packets to the receiving compute node by way of the inter-node communication network.

Further aspects of the invention provide compute nodes for use in a multiprocessor computer system and network interfaces for use in such compute nodes. The network interfaces include a facility for maintaining associations between one or more ranges of addresses in an address space of the compute node and corresponding other compute nodes. The network interfaces are configured to receive packets on a local packetized interconnect addressed to addresses in the one or more ranges of addresses; encapsulate the packets in inter-node communication network packets addressed to the corresponding receiving compute nodes; and, dispatch the inter-node communication network packets to the corresponding receiving compute node by way of the inter-node communication network.

Further aspects of the invention and features of specific embodiments of the invention are described below.

BRIEF DESCRIPTION OF THE DRAWINGS

In drawings which illustrate non-limiting embodiments of the invention.

DESCRIPTION

Figure 1:
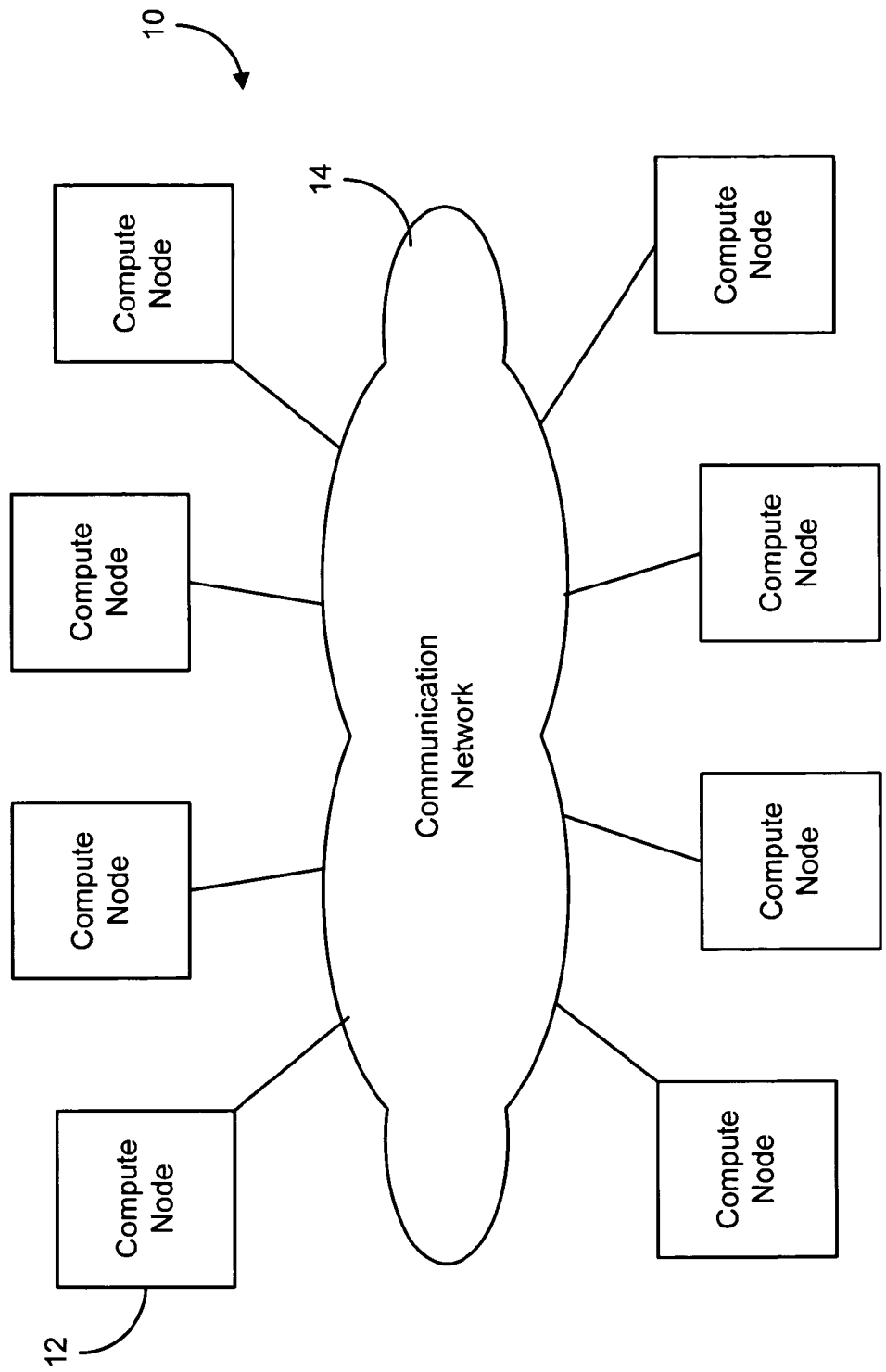
FIG. 1 is a block diagram illustrating the architecture of a prior art multiprocessor computer.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The invention provides method and apparatus for providing low latency communication between nodes of multi-processor computer systems. The invention takes advantage of the packet-based nature of packetized interconnects such as, for example, HyperTransport™, RapidIO™, and PCI Express™.

Embodiments of the invention support limited sharing of memory in a distributed memory architecture. Such embodiments map a portion of the address space of a receiving compute node to the address space of a sending compute node. The mapped address space might hold message buffers to support messaging or pages of memory to support shared memory communication. The sending CPU sends a message by writing it to the mapped address space. The write request packets issued by the sending CPU are directed to the sender's network interface. The sender's network interface wraps the write request packets within a communication network packet and tunnels them through the communication network to the receiving compute node. The receiver's network interface unwraps the write request packets and forwards them to the receiver's memory.

Either the sender's or receiver's network interface may edit the write request packets to change a target memory address according to the previously established address mapping. One of the network interfaces or the receiver's memory may optionally respond with a write confirmation packet.

The invention will be described herein by way of some non-limiting examples. In the following description, most reference numerals are incremented by 100 from reference numerals assigned to functionally similar elements of the prior art systems described above.

Figure 2:
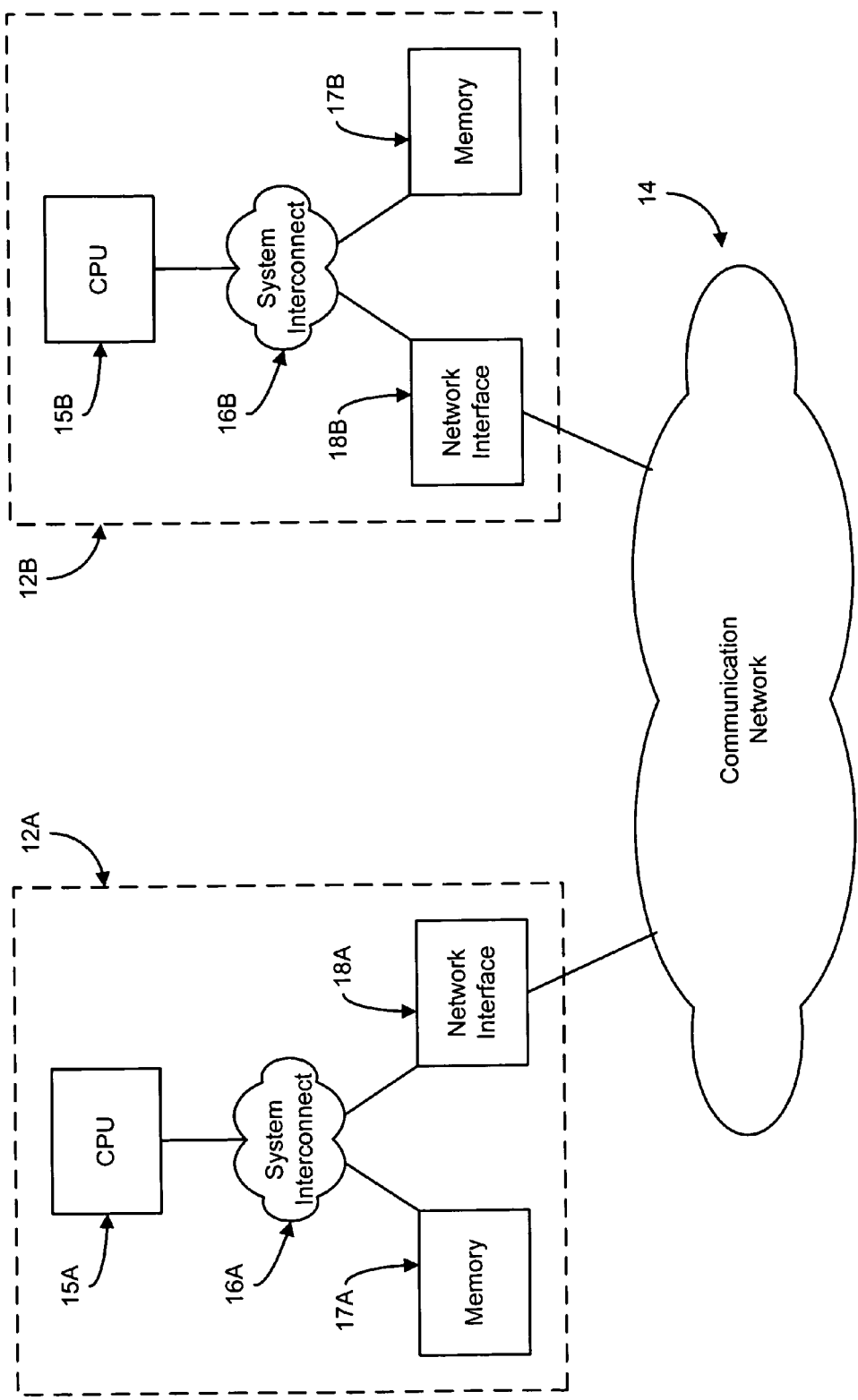
FIG. 2 is a block diagram illustrating the structure of compute nodes in a prior art multiprocessor computer.
Figure 2A:
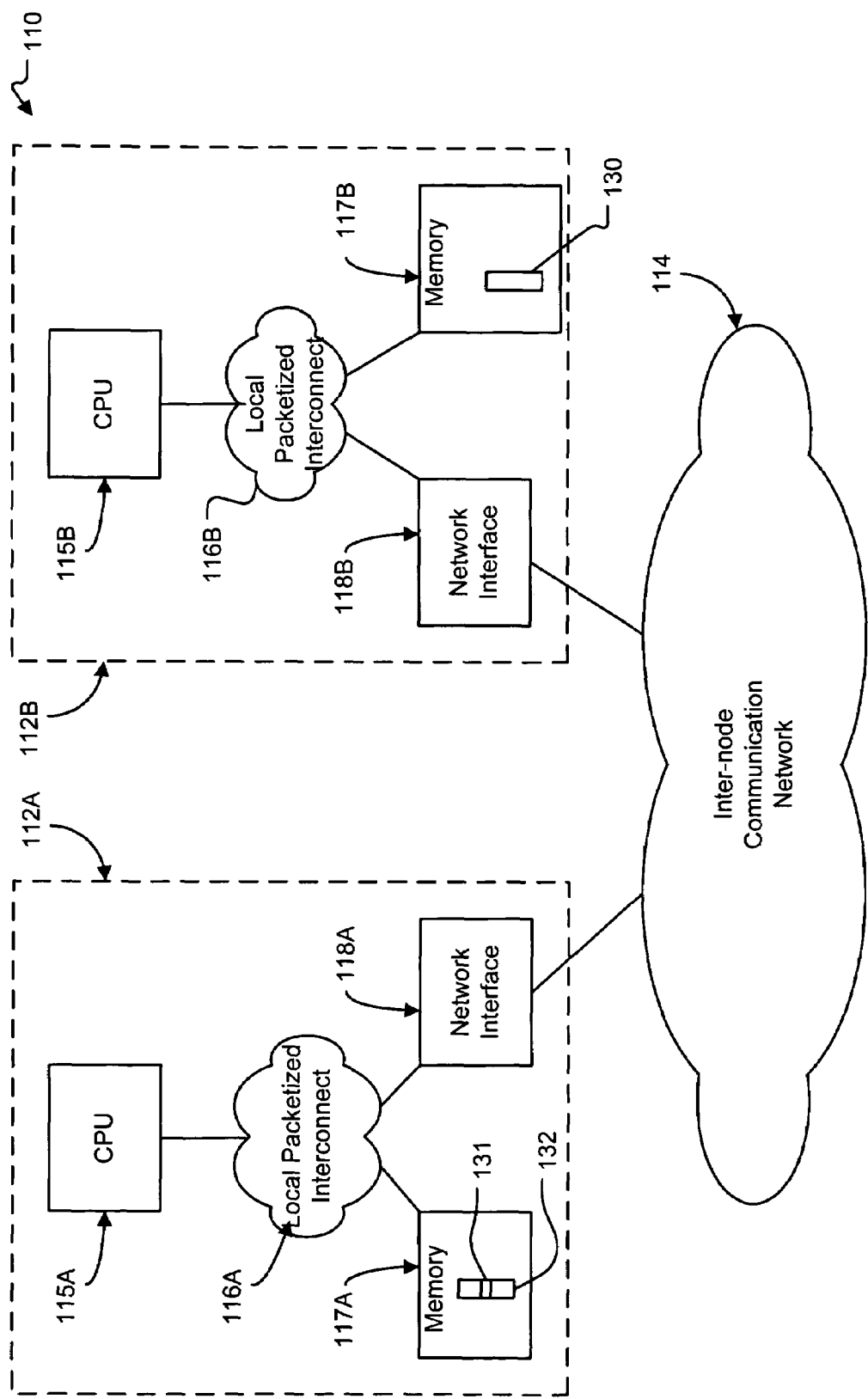
FIG. 2A is a block diagram illustrating a multiprocessor computer according to one embodiment of the invention.

In an example embodiment of the invention shown in FIG. 2A, a computer system 110 includes a number of compute nodes 112 interconnected by a communication network 114. Each of the compute nodes includes one or more processors 115, memory 117 in an address space of processor(s) 115. Each compute node 112 also has one or more network interfaces 118 which provide gateways for communication with network 114. Within each compute node 112 network interface(s) 118 and processor(s) 115 are interconnected by a system of packetized interconnects 116, which may be called a "local packetized interconnect". The local packetized interconnect may be constructed and operate according to any suitable packetized interconnect protocol. HyperTransport™, RapidIO™ and PCI Express™ are three examples of currently available packetized interconnect protocols suitable for use as local packetized interconnects in embodiments of this invention.

Network 114 also operates according to a packetized protocol. Network 114 may be called an inter-node packetized communication network. Any suitable network architecture may be used for network 114. There exist various technologies suitable for network 114. Infiniband™ is one such technology. In general, network 114 should be capable of carrying data between compute nodes 112 at rates of at least 300 MBps. In typical applications of the invention, network 114 provides link data rates in excess of 1 GBps.

Prior to communicating data from a sending compute node 112A to a receiving compute node 112B, a region 130 within memory 117B of receiving compute node 112B is selected and allocated. Compute node 112B communicates to compute node 112A that memory region 130 has been allocated. This may be done, for example, by sending a message containing information specifying the address range associated by compute node 112B with memory region 130 to sending compute node 112A via network interface 118B. Network interface 118B may optionally maintain an association between the selected address range and sending compute node 112A.

Figure 3:
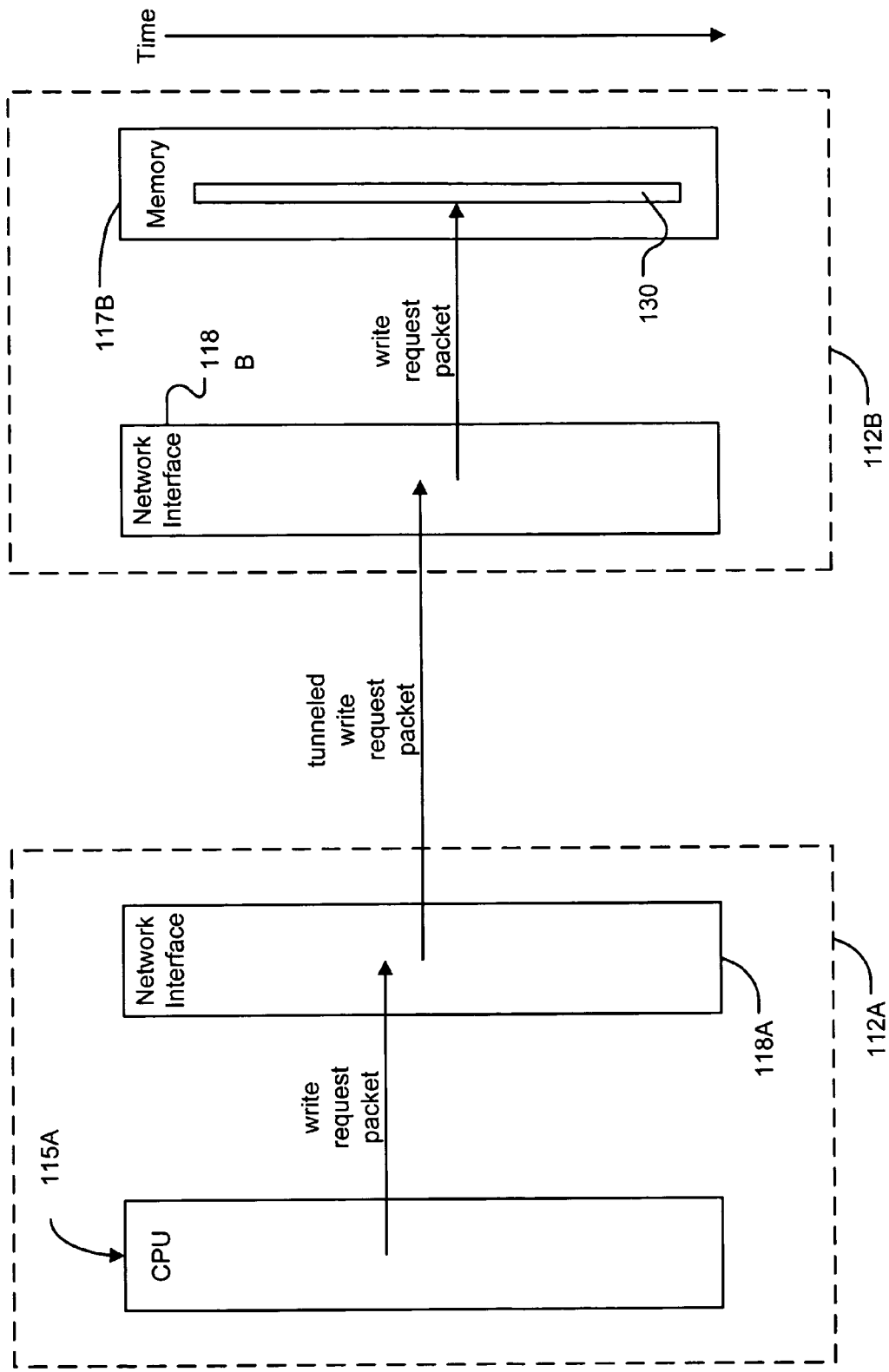
FIG. 3 illustrates a first compute node writing a message into the memory of a second compute node according to a method of the invention.
Figure 3A:
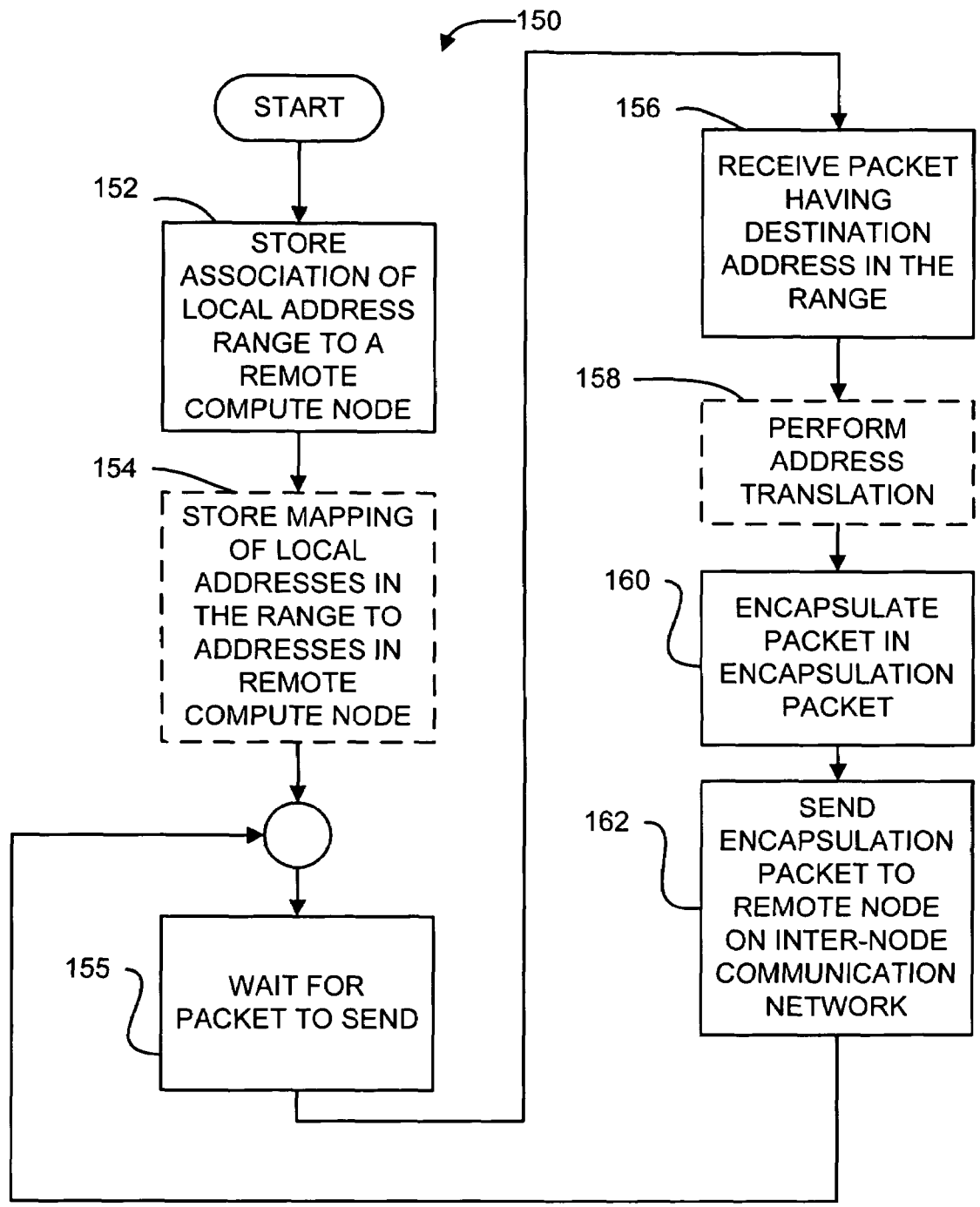
FIG. 3A is a flow diagram illustrating a method which is performed at an interface of a sending node to an inter-node communication network in some embodiments of the invention.

FIG. 3A illustrates a method 150 which is performed at a sending network interface 118A in some embodiments of the invention. Blocks having dotted outlines are required only if address translation is performed at sending network interface 118A, as discussed below. Sending CPU 115A allocates an address range in its own address space having a size at least equivalent to the size of region 130. The address range corresponds to region 130 and is assigned to network interface 118A. As indicated by block 152, network interface 118A associates the allocated address range with receiving compute node 112B. Except for the actual addresses used, there is a 1:1 correspondence between the address ranges allocated to correspond to region 130 at sending compute node 112A and at receiving compute node 112B. Once network interface 118A has been initialized, network interface 118A waits (block 155) for packets addressed to the allocated address range.

To send a message (see FIGS. 3 and 3A), sending CPU 115A writes the message on its local packetized interconnect 116 to an address in the address range it has allocated to correspond to region 130. Because the range is associated with network interface 118A, packetized interconnect write request packets are directed to network interface 118A.

Upon receipt of the write request packets, (FIG. 3A, block 156) network interface 118A identifies receiving compute node 112B as the desired destination for the packets and encapsulates (block 160) the write request packet for transmission over communication network 114 to compute node 112B. Encapsulation typically comprises wrapping packets of packetized interconnect 116 which are to be sent to a remote node with packet headers which include an address of destination compute node 112B according to the network protocol under which inter-node communication network 114 operates. Network interface 118A transmits the inter-node communication network packets to network interface 118B of receiving compute node 112B (block 162).

At receiving compute node 112B, the write request packets are extracted from the arriving inter-node communication network packets. Extracting the write request packets typically involves removing headers provided by the protocol used by inter-node communication network 114. Extraction retrieves the original write request packets formatted for transit on the local packetized interconnect of receiving compute node 112B. The write request packets are forwarded by way of local packetized interconnect 116B to memory 117B where the write operation is performed.

The address range which corresponds to memory region 130 in the address space of sending compute node 112A will typically not be the same as the address range corresponding to memory region 130 in the address space of receiving compute node 112B. An address translation is performed at some point before the packets are forwarded to memory 117B. The address translation can most conveniently be performed either at network interface 118A or at network interface 118B. The address translation can be performed by editing the write request packets in transit to change the address in the write request packet from an address in the address space of sending compute node 112A to the corresponding address in memory region 130 in the address space of receiving compute node 112B.

The dashed outline blocks of FIG. 3A are performed when address translation is done at sending interface 118A. In block 154 mapping information specifying the mapping of local addresses in the range to addresses in the address space used by packetized interconnect 116B of receiving compute node 112B are stored where they are accessible to an address translation facility of interface 118A. In block 158 address translation is performed. Address translation typically comprises using the destination address of the incoming packet and the mapping information to determine a mapped address to which the packet should be delivered in the address space used by packetized interconnect 116B of receiving compute node 112B. The mapped address is written into the packet in place of the original destination address.

The packetized interconnect packets are transferred from sending node 112A to their destinations in region 130 of memory 117B with substantially no alterations. Only the addresses are altered. It is unnecessary to remove or transform headers of the packetized interconnect packets into packet headers of another protocol at any time during communication. In this embodiment, it is unnecessary for CPU 115A to be aware of or construct packet headers of inter-node communication network 114. This reduces latency in comparison to prior art techniques which involve transforming local packetized interconnect packets into inter-node communication network packets at network interface 118A and back to local packetized interconnect packets at network interface 118B.

It is interesting to note that the original packetized interconnect write request packets are sent over communication network 114 between network interfaces 118A and 118B by inserting them into inter-node communication network packets. This process of carrying one type of packet inside another type of packet is referred to as tunneling.

CPUs 115A and 115B and their respective address spaces are independent of each other. CPUs 115A and 115B have a peer relationship with one another. While communication has been described as being directed from compute node 112A to 112B, the reciprocal communication relationship can be established to support two-way communication between CPUs 115A and 115B. This can be achieved by mapping a region of memory 117A into the address space of CPU 115B. CPU 115B can then write messages to network interface 118B which are tunneled through to memory 117A.

In some embodiments of the invention, system 110 includes a mechanism for automatically setting up reciprocal connections between pairs of specified nodes 112. In some embodiments of the invention, system 110 includes a mechanism for establishing a one-way link between a specified pair of nodes 112. The mechanism may be invoked twice to configure the system to include reciprocal links to permit direct two-way communication between the pair of nodes.

Most packetized interconnect technologies use fairly small packets. For example, packets in current versions of HyperTransport™ can carry a maximum data payload of 64 bytes. Packets of current implementations of RapidIO™ can carry a maximum data payload of 256 bytes. Where a packetized interconnect technology uses packets that carry a small maximum payload, bandwidth on communication network 114 can be conserved by collecting together two or more consecutive packetized interconnect packets into one communication network packet during tunneling. This reduces the amount of bandwidth of inter-node communication network 114 used to transmit communication network protocol packet headers.

In some cases it is possible to combine consecutive packetized interconnect packets into a single (possibly non-standard) packetized interconnect packet to reduce the overhead expended in packetized interconnect packet headers. Packet merging can be especially effective for large data transfers.

In some embodiments of the invention, two or more packetized interconnect packets are encapsulated in a manner which avoids sending duplicated header information. The local packetized interconnect packets each comprise header information and a payload. At least some of the header information is the same for each of the local packetized interconnect packets. In such embodiments, encapsulating the local packetized interconnect packets comprises placing into the inter-node communication network packet the payloads of the two or more local packetized interconnect packets and the header information from fewer than all of the local packetized interconnect packets. In some embodiments of the invention header information from only one of the two or more packetized interconnect packets is included in the inter-node communication network packet. The header information is used at the network interface of the receiving compute node to reconstitute the two or more packets.

As an example of how reducing the repeated transmission of header information can increase the efficiency with which local packetized interconnect packets can be tunneled from a sending compute node to a receiving compute node, consider a TCP/IP-based communication network being used to tunnel HyperTransport™ data packets. If each HyperTransport™ data packet is tunneled separately, each 64 byte data packet has to be wrapped with either an 8 byte UDP or a 20 byte TCP packet header. This is wrapped in turn with a 20 byte IP header. In the case of TCP, the 64 byte data packet is wrapped with 40 bytes of packet headers. The effective bandwidth of the communication network drops to approximately 62%. If as few as two consecutive 64 byte HyperTransport™ data packets can be collected into a single TCP/IP packet, the effective bandwidth increases to approximately 76% by avoiding the second IP and TCP packet headers. If 10 consecutive 64 byte data packets of a large data transfer can be merged into a single TCP/IP packet, the effective bandwidth increases to approximately 94%.

Sending CPU 115A can optionally indicate in the write request packet that a write confirmation is required. There are a number of entities in the data path between a source in a sending compute node and a destination in a receiving compute node which may be configured to return such write confirmation packets.

Figure 4:
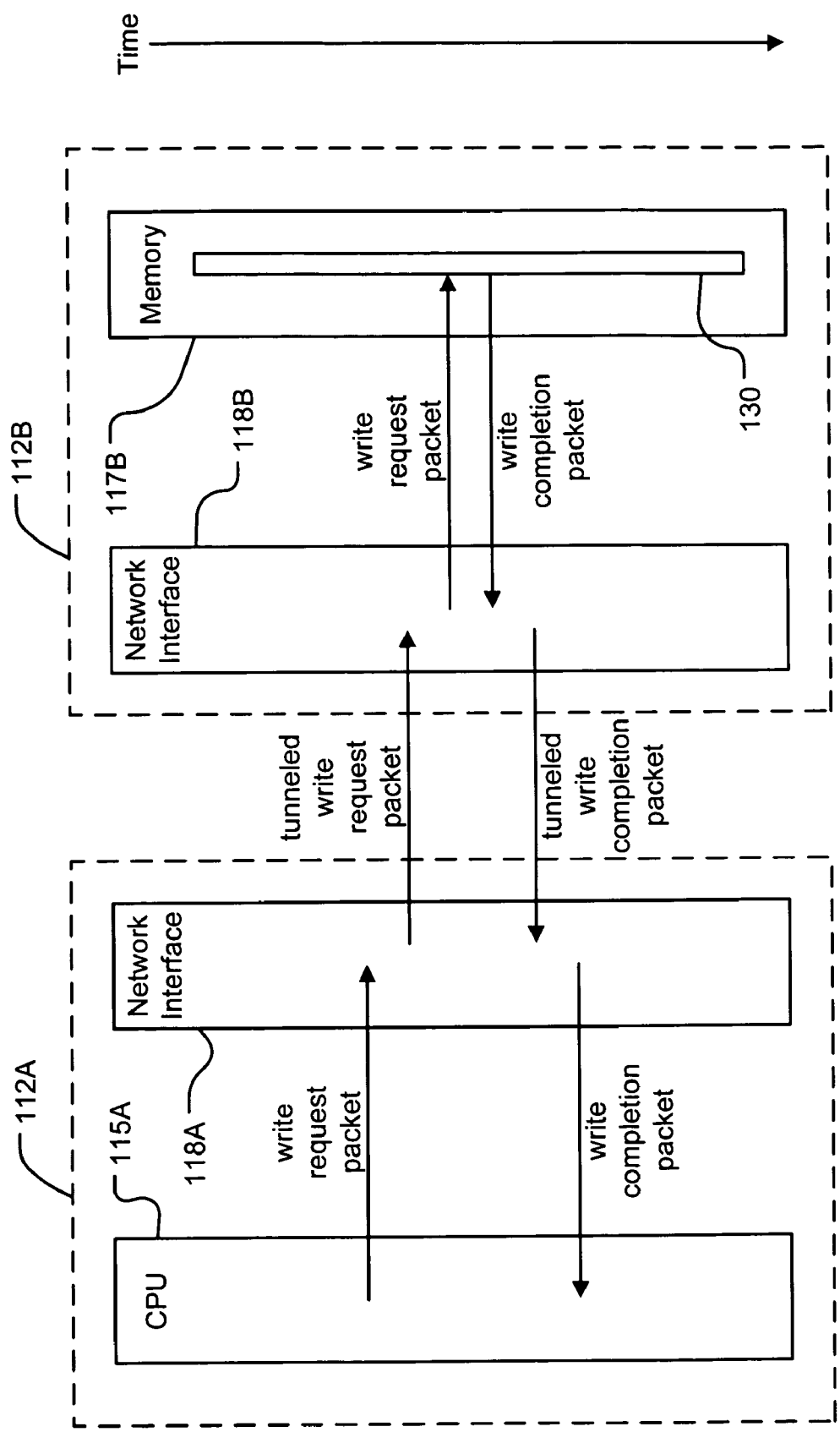
FIG. 4 illustrates a first compute node writing a message into the memory of a second compute node and the memory in the second compute node returning a write confirmation packet to the first compute node according to a method of the invention.

In some embodiments of the invention, sending CPU 115A does not operate a write completion timer or the timeout is long enough to allow for a round trip communication delay to receiving compute node 112B. In such cases, memory 117B may generate and return write confirmation packets (see FIG. 4). Network interface 118B tunnels the write confirmation packet to network interface 118A which forwards it to sending CPU 115A.

The tunneling of the write confirmation packet is the inverse of the tunneling of the write request packet, especially with regards to address editing in transit. For example, suppose that address range 3000-3999 in compute node 112B has been mapped to address range 1000-1999 in compute node 112A. CPU 115A may write data to address 1100 (with the intention that the data be written to address 3100 in the address space of compute node 112B). To do so, CPU 115A generates a write request. The write request is made up of one or more packets on packetized interconnect 116A.

The write request is structured according to the protocol for the local packetized interconnects 116 of compute nodes 112. The write request is addressed to address 1100. The write request is transferred to memory 117B. At some point along the way, an address translation is performed so that the destination address is converted from address 1100 to address 3100. This permits packetized interconnect 116B to deliver the packet to the appropriate location at address 3100 of memory 117B.

In this example, memory 117B issues a write confirmation packet to acknowledge the write to address 3100. The write confirmation packet is automatically returned by memory 117B to interface 118B from where it is tunneled back from receiving compute node 112B to sending compute node 112A. In some embodiments, interface 118B preserves header information from an inter-node communication network packet in which the write request was encapsulated for use in returning the corresponding write confirmation packet to node 112A.

The write confirmation packet may include, for example in its payload, the address 3100 at which the write occurred. This address is translated back into the corresponding address in the address space of sending node 112A (in this example, the translation converts from address 3100 back to 1100).

Figure 4A:
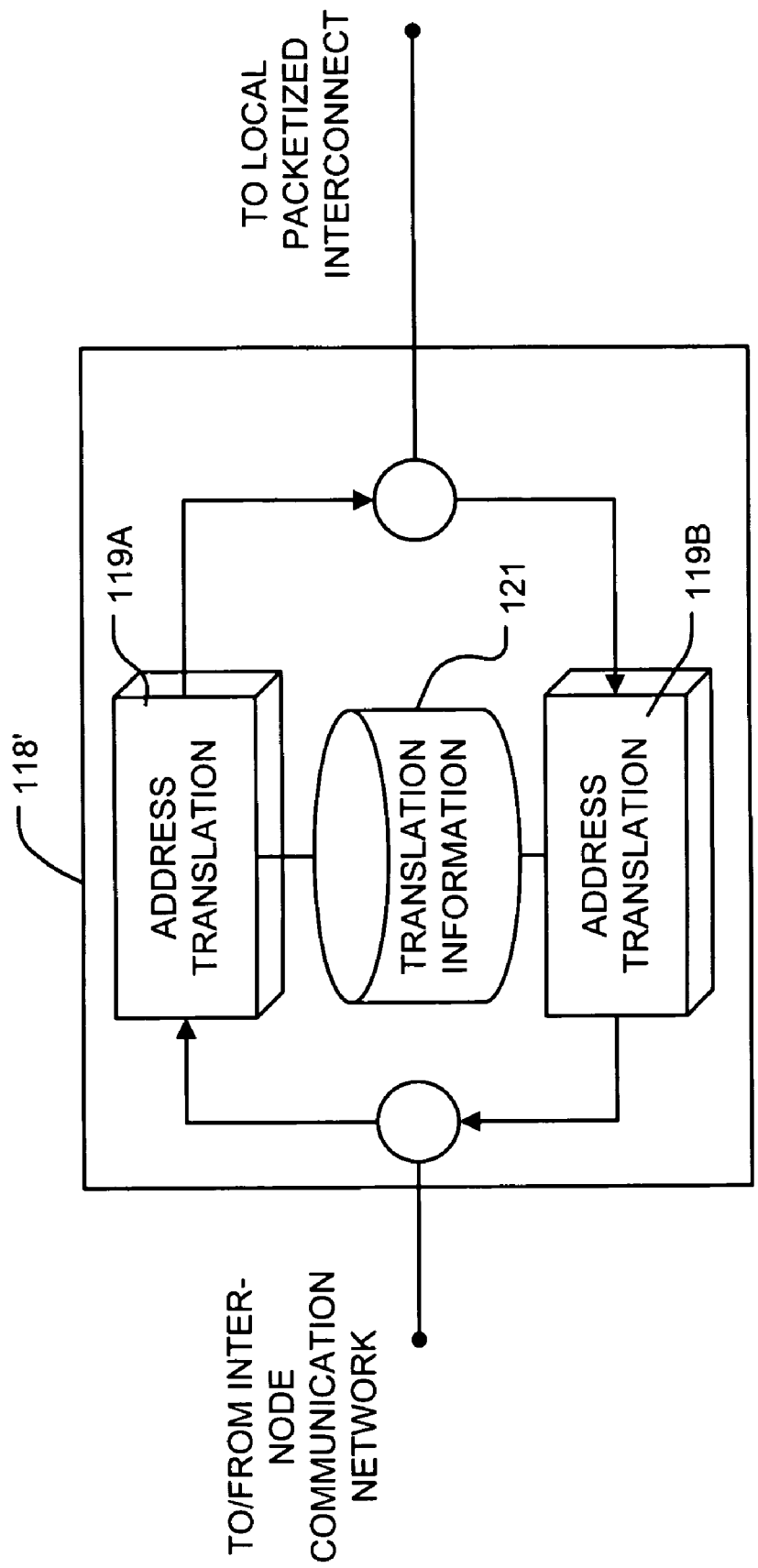
FIG. 4A is a block diagram illustrating a network interface according to an embodiment of the invention.

Separate facilities may be provided for translating the addresses to which packetized interconnect packets are addressed and translating the addresses at which write operations have occurred. These separate facilities are not necessarily commonly located. FIG. 4A illustrates an interface 118' according to one embodiment of the invention in which address translation is performed on incoming write requests and on outgoing write confirmation packets. Interface 118' includes a facility 119A for translating the addresses to which incoming write requests are directed. In this embodiment, facility 119A is implemented in hardware (for example, in logic gates configured in an FPGA). Facility 119A maintains an address translation table 121 which includes address translation information for a number of nodes which might send write requests to the node which includes interface 118'. Interface 118' also includes a facility 119B for translating addresses within write confirmation packets being sent to confirm the completion of a write request. Facility 119B may use address translation table 121 or saved information about the write request to which the write confirmation packet corresponds for performing the address translation on write confirmation packets.

In the alternative, an interface 118' could be configured so that facility 119B performs address translation on outgoing write requests and facility 119A performs address translation on incoming write confirmation packets.

Figure 9:
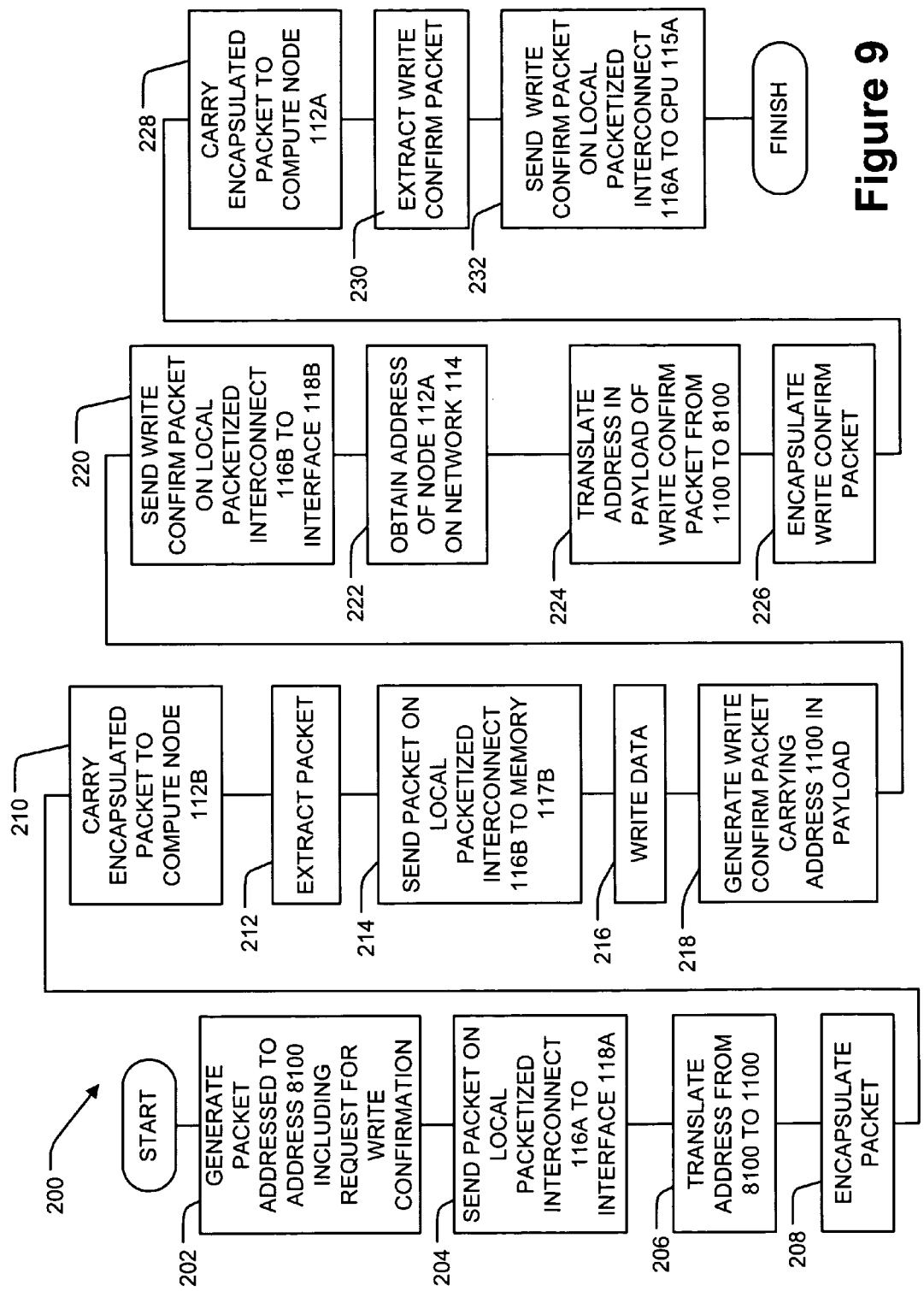
FIG. 9 is a flow chart illustrating a method for writing data to a memory in a receiving compute node according to an example embodiment of the invention.

For example, consider the example method 200 shown in FIG. 9. In this example, an address range 1000-1999 in the address space of compute node 112B, which corresponds to a region 130 in memory 117B is mapped to the address range 8000-8999 in the address space of compute node 112A to support the delivery of data from compute node 112A to compute node 112B.

Method 200 is initiated when compute node 112A desires to send data to receiving compute node 112B. In block 202 a write request is prepared. The write request contains the data to be sent and an indication that a write confirmation is requested. The write request comprises one or more packets structured in the manner provided by a protocol on which local packetized interconnects 116A and 116B operate. For simplicity it will be assumed that the write request comprises a single packetized interconnect packet. The write request packet is addressed to address 8100.

In block 204 the write request is sent on local packetized interconnect 116A. Since address 8100 is associated locally with network interface 118A the write request is delivered to interface 118A. In block 206 a facility provided at interface 118A determines that address 8100 is within a range of addresses which have been associated with compute node 112B and translates the destination address of the write request packet from 8100 to the corresponding address 1100. The packetized interconnect packet(s) of the write request are then encapsulated in one or more inter-node communication network packets capable of being sent over inter-node communication network 114 (block 208). Interface 118A addresses the inter-node communication network packet to an address corresponding to interface 118B of compute node 112B.

In block 210 the inter-node communication network packet is carried to interface 118B in inter-node communication network 114. In block 212 the write request packet is extracted from the inter-node communication network packet. The write request packet is then dispatched (block 214) on local packetized interconnect 116B to address 1100 which is in memory 117B. In block 216 a controller of memory 117B writes data from the payload of the write request packet to the memory location at address 1100 and detects the request for a write confirmation.

In response to the request, the controller generates a write confirmation packet in block 218. The write confirmation packet includes in its payload the address, 1100, at which the data was written. In block 220 the write confirmation packet is carried by local packetized interconnect 116B to interface 118B. The write confirmation packet may be directed automatically to interface 118B since interface 118B appears to memory 117B to be the device from which the write request originated.

Interface 118B identifies the write confirmation packet as a write confirmation packet corresponding to the previously-received write request. Interface 118B identifies sending node 112A as the source of the write request (block 222). This identification may, for example, involve retrieving information from the header of the inter-node communication network packet in which the write request was encapsulated.

A write confirmation packet processing facility in interface 118B translates the address in the payload of the write confirmation packet from 1100 to 8100 (block 224). In block 226 the write confirmation packet is encapsulated in an inter-node communication network packet capable of being carried on inter-node communication network 114. The inter-node communication network packet is addressed to an address corresponding to interface 118A. In some cases, construction of the inter-node communication network packet can be facilitated by using header information from the header of the inter-node communication network packet which carried the write request to node 112B to construct a header for the inter-node communication network packet to be used in returning the write confirmation packet back to node 112A.

In block 228 the inter-node communication network packet is carried to interface 118A. Interface 118A receives the inter-node communication network packet and extracts (block 230) the write confirmation packet from the inter-node communication network packet. Interface 118A identifies the write confirmation packet as corresponding to the previously-sent write request and returns the write confirmation packet to the source of the write request (typically CPU 115A) on local packetized interconnect 116A (block 232).

Figure 5:
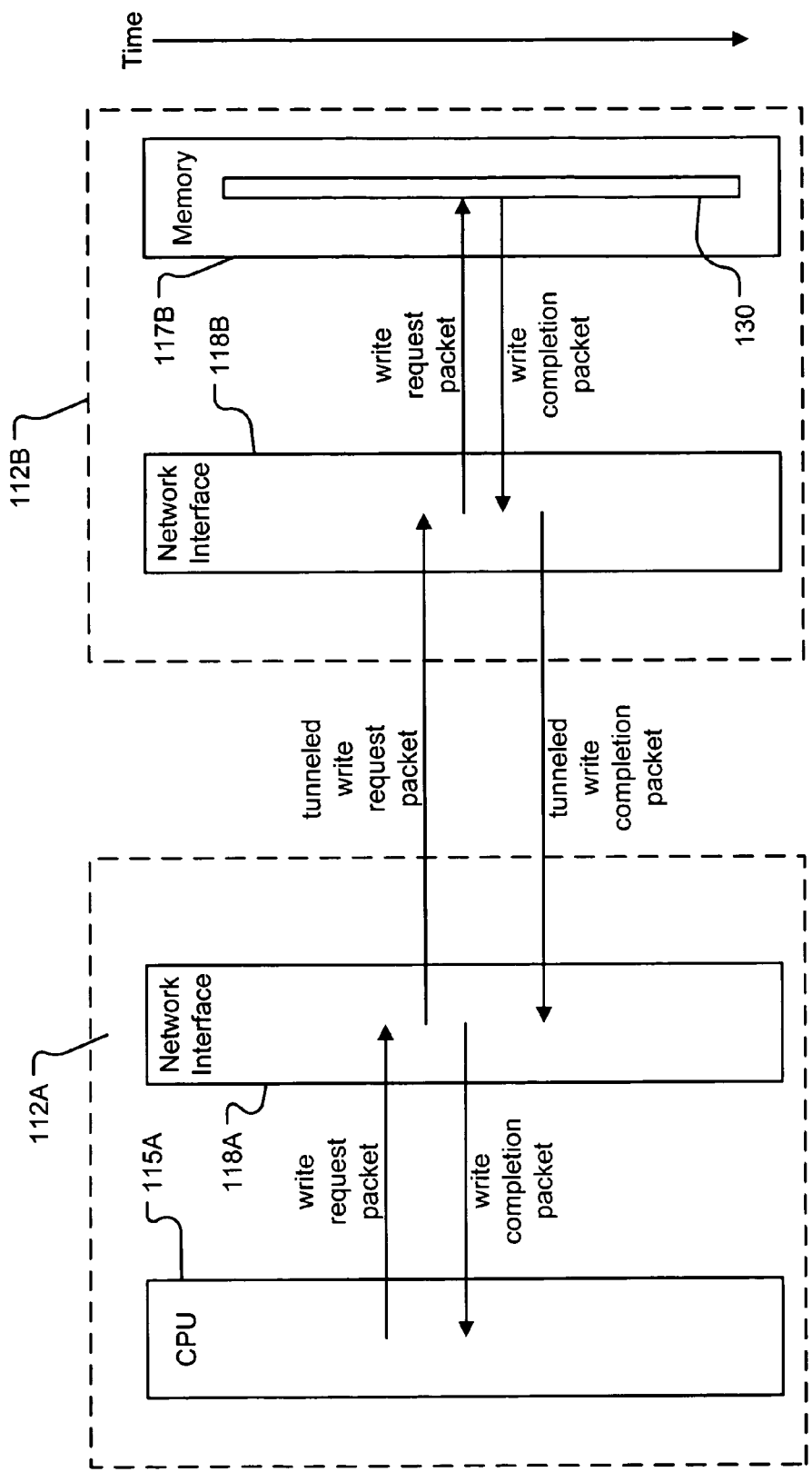
FIG. 5 illustrates a network interface in a first compute node generating a write confirmation packet to satisfy a short write completion timeout.
Figure 6:
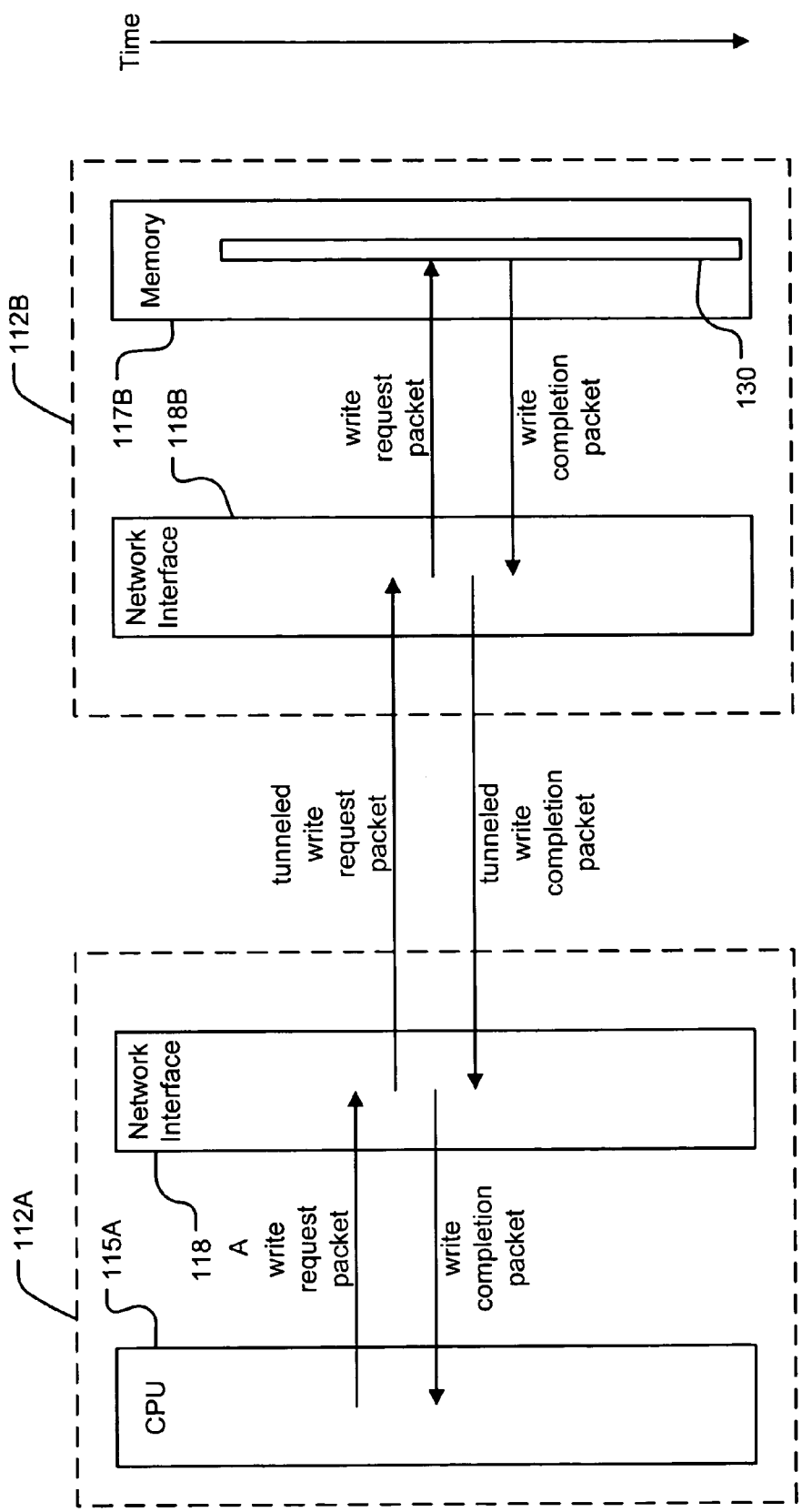
FIG. 6 illustrates a network interface in a second compute node returning a write confirmation packet to the network interface in a first compute node according to the invention in order to satisfy a short write completion timeout.

In other embodiments of the invention, the write confirmation timeout is not long enough to allow for a round trip communication delay to receiving compute node 112B. In such embodiments (see for example, FIGS. 5 and 6), network interface 118A returns a write confirmation packet to sending CPU 115A once it has received the write request packet(s). This design assumes that network interface 118A will ensure that the write successfully completes.

Network interface 118A may save write request packets until it subsequently receives corresponding write confirmation packets from the receiving compute node(s) 112 to which the write request packets were directed. Network interface 118A may optionally operate its own write confirmation timeout. Such a write confirmation timeout should be long enough to take into account expected round trip communication delays. Network interface 118A may be configured to re-send the saved write request if a write confirmation packet is not received by the write confirmation timeout.

In some embodiments of the invention write confirmation packets are generated at receiving compute node 112B. In some such embodiments, network interface 118B forwards any write requests to memory 117B and tunnels any write confirmation packets returned by memory 117B to network interface 118A (see FIG. 5). In other embodiments, network interface 118B generates write confirmation packets in response to receiving write requests (see FIG. 6). In such embodiments it is desirable that network interface 118B includes some mechanism for ensuring that the write is performed successfully. For example, network interface 118B may save write requests until it receives corresponding write confirmation packets from memory 117B. Network interface 118B may operate its own write completion timeout. Network interface 118B may be configured to re-send saved write requests to memory 117B if corresponding write confirmation packets are not received by its write completion timeout.

It can be seen that in the embodiments discussed above, sending CPU 115A and receiving CPU 115B do not have to write or read control registers in network interfaces 118A or 118B respectively to send or receive messages. This can reduce latency in comparison to comparable prior art systems in which a number of control registers must be read and/or written before data can be sent to another compute node. At network interface 118A, latency has been improved by not having to strip the write request packet headers or alternatively extract the write request payload. At network interface 118B, latency has been improved by not having to construct write request packet headers.

The above message sending scheme is very suited to the eager protocol and small messages. Under software control, CPU 115A generates write request packets to send a message to memory 117B.

Figure 7:
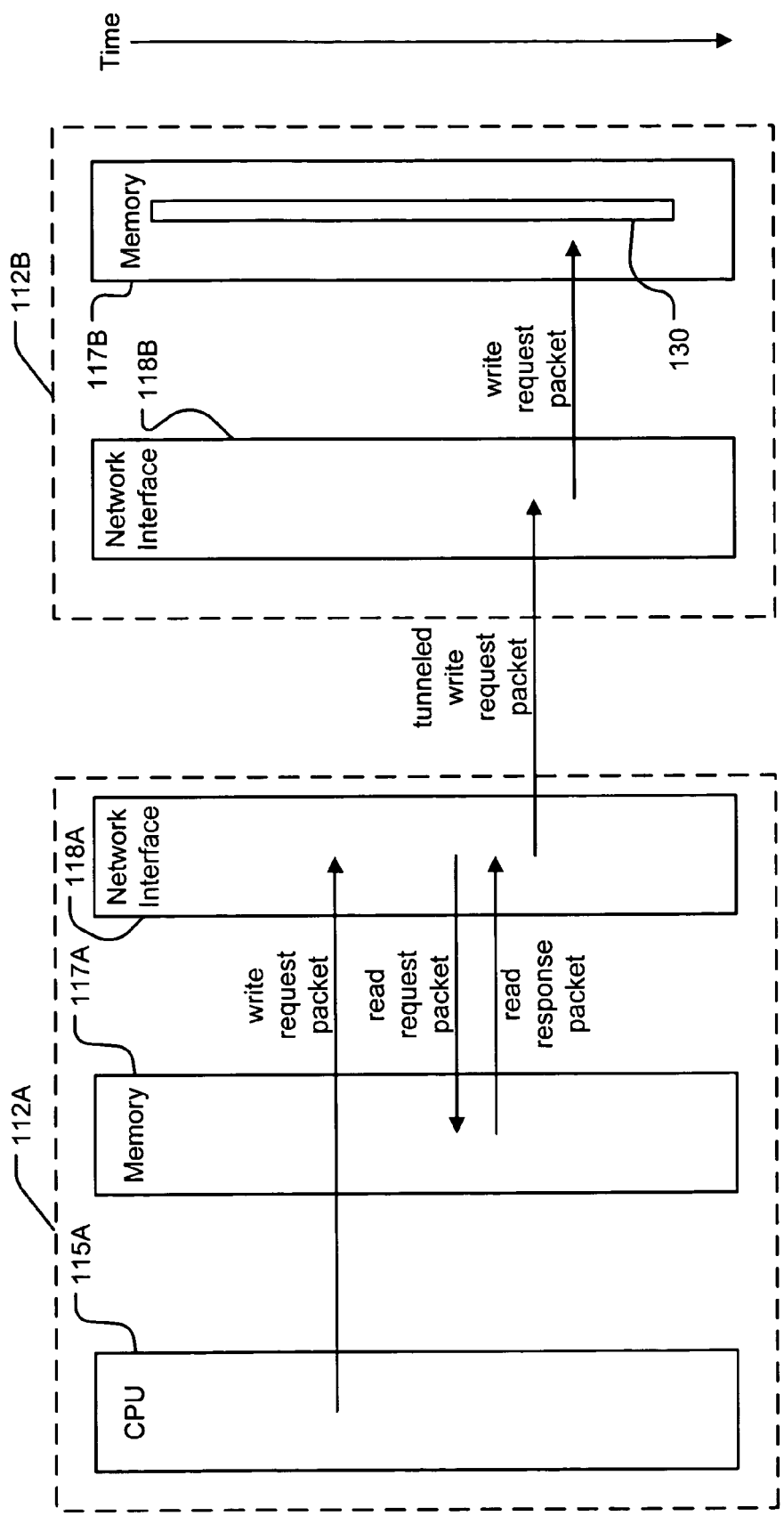
FIG. 7 illustrates an interface of a first compute node writing a message retrieved from the memory of the first compute node into the memory of a second compute node according to the invention.

Large messages may be sent more efficiently using a rendezvous protocol. In some implementations of the invention, network interface 118A is configured to coordinate message sending, as shown in FIG. 7. CPU 115A writes the address and size of the message to a control register of network interface 118A. Network interface 118A proceeds to generate and send read request packets to memory 117A to retrieve the message. Memory 117A generates one or more read response packets which contain the requested data. As each read response packet is received at network interface 118A, it is transformed into a write request packet that is tunneled to memory 117B. In this implementation, read response packets have to be transformed into write request packets. However, specifications for packetized interconnects typically specify enough structural similarity between read response packets and write request packets that one can be converted to the other with only a small impact on latency. To construct the write request packets that are tunneled to compute node 112B, network interface 118A may know the address of memory region 130 in the address space of compute node 112B.

Figure 8:
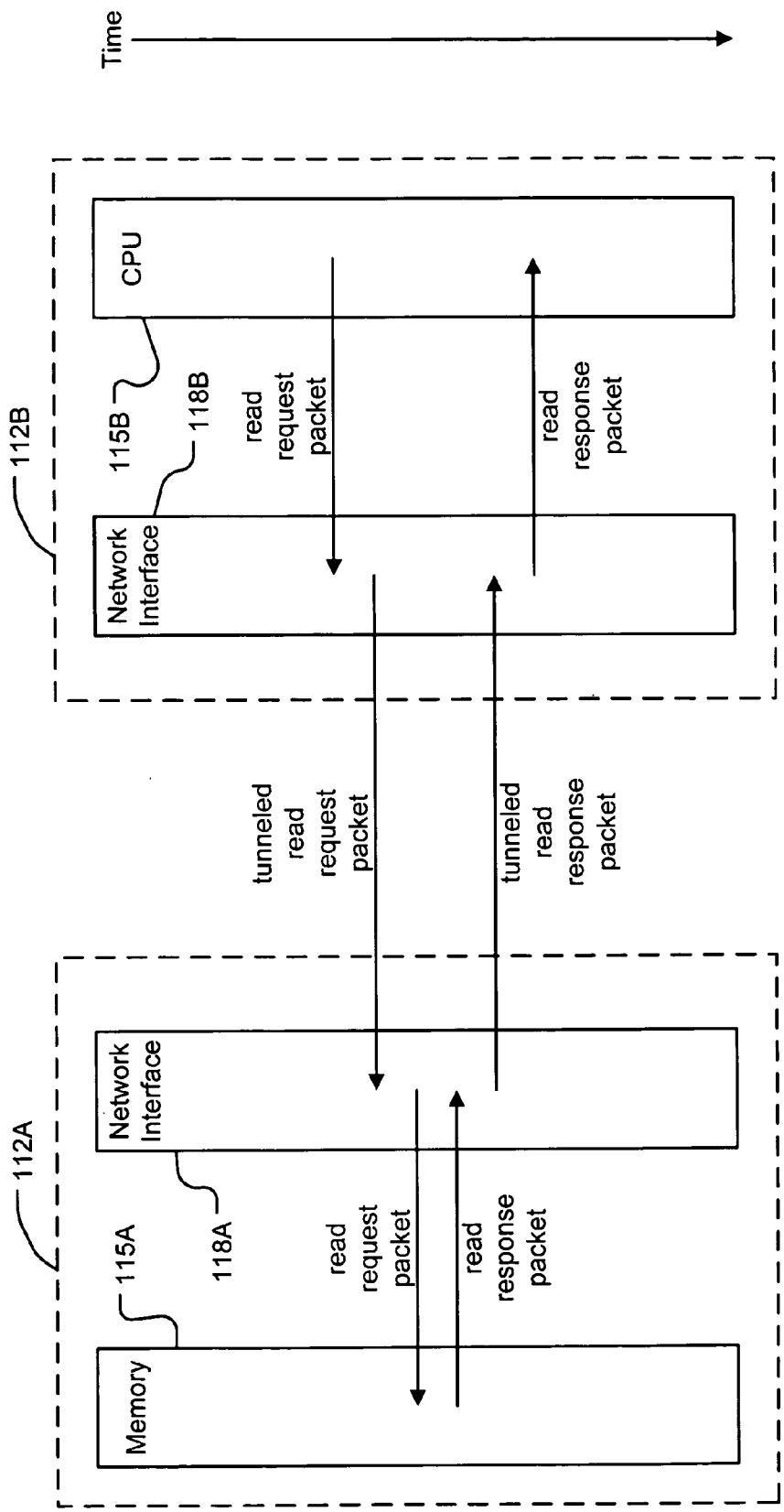
FIG. 8 illustrates a receiving compute node using an address mapping to read a message from a memory in a sending compute node.

The above examples involve a sending CPU 115 writing a message to a receiving memory 117 of a different compute node 112. In other embodiments of the invention, a receiving CPU 115B uses an address mapping to read a message from sending memory 117A. In this case, a selected region of sending memory 117A is mapped to the address space of receiving compute node 112B. CPU 115B directs read request packets (see FIG. 8) to network interface 118B. The read request packets are tunneled to network interface 118A as described above. Network interface 118A forwards the read request packets to memory 117A.

Either network interface 118B or 118A or some other facility at a suitable location on the data path performs translation of the addresses and edits the addresses in the read request packets in accordance with the address mapping. Read response packets are returned from memory 117A to network interface 118A where they are tunneled through to network interface 118B. If the read response packets contain any memory addresses, either network interface 118A or 118B or another facility at a suitable location on the data path could edit the addresses in transit in accordance with the memory mapping. Network interface 118B forwards the read response packets to CPU 115B.

If CPU 115B operates a read completion timer, the read completion timeout must be long enough to handle the round trip delay to memory 117A. It is not possible for either network interface 118A or 118B to return a read response packet to satisfy a shorter timeout, because the read response packet would not contain the desired message. If the read completion timer times out in a time which is too short to handle the round trip delay, messages must be written rather than read.

In some embodiments, all or part of the message reading operation is handled by network interface 118B. In such embodiments, CPU 115B may not need to actively participate in message reading. Network interface 118B could generate and tunnel read request packets through to memory 117A. When network interface 118B receives read response packets, it transforms them into write request packets and sends them to memory 117B.

The embodiments described herein map a region of memory in one compute node into the address space of another compute node. Once a first portion of memory has been mapped, the mapping can be changed to substitute a second portion of memory for the first portion of memory. As long as the substituted second portion of memory is the same size as the first portion of memory, it may not be necessary to inform the remote CPU as long as it is not aware of or does not need to use the addresses of the first portion of memory. As an example, if the mapped first portion of memory contains buffers to hold received messages, a second portion of memory might be substituted for the first portion of memory when the buffers are full. It must be ensured that the remote CPU is not caching any of the mapped address range at the moment when the second portion of memory is substituted for the first portion of memory.

Figure 10A:
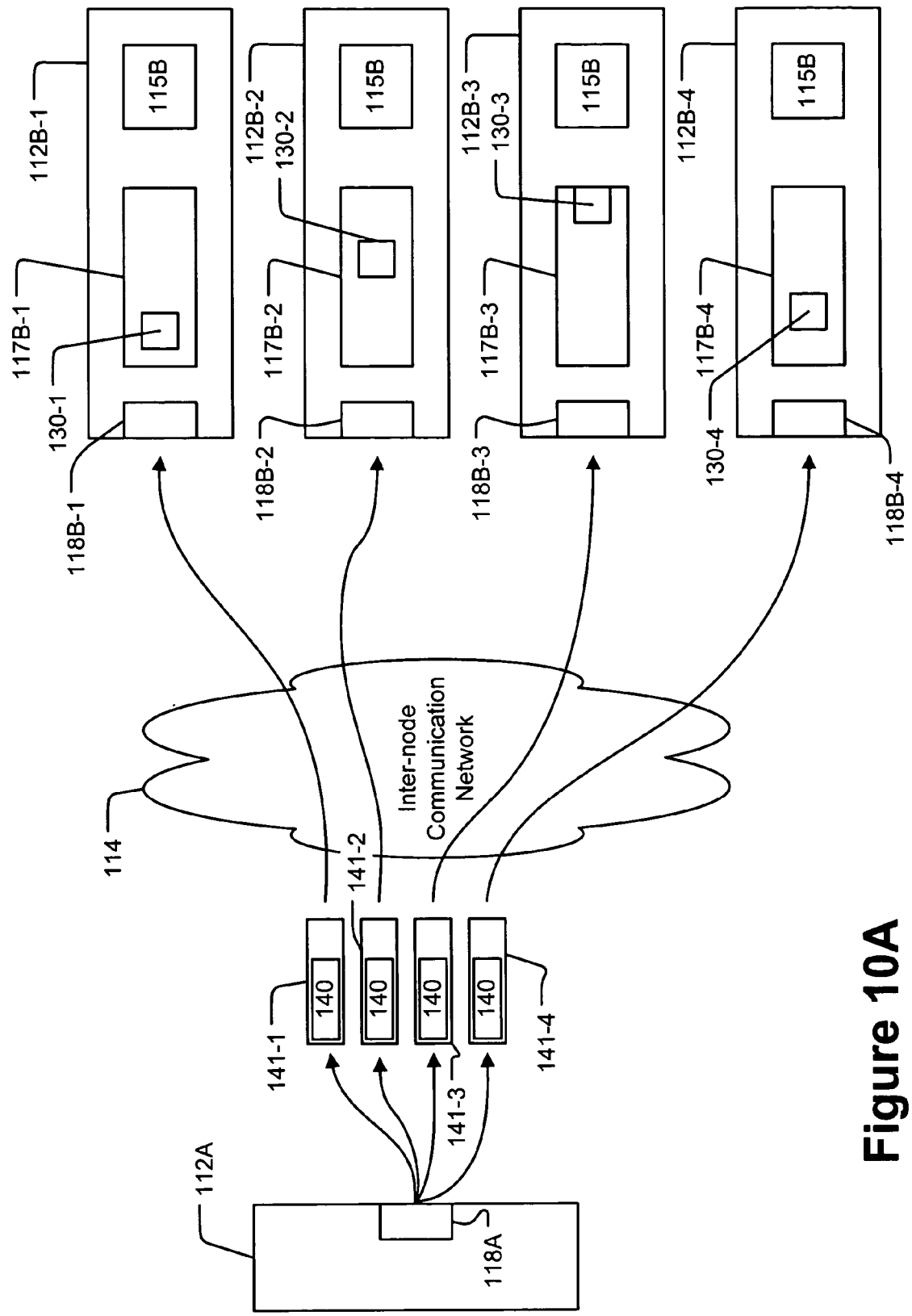
FIG. 10A is a schematic view of a computing system according to one embodiment of the invention wherein an address range in a sending compute node is mapped to memory regions in multiple receiving compute nodes.

In some embodiments of the invention one memory region in a sending compute node 112 is mapped to the address spaces of each of multiple remote CPUs. For example, such a mapping might be used to share a critical data structure with some or all of the compute nodes in the system. In such embodiments, as shown for example in FIG. 10A, interface 118A of sending compute node 112A could make multiple copies of each write request packet 140 and encapsulate each of the copies in an inter-node communication network packet 141-1 to 141-4 for transmission across inter-node communication network 114 to multiple receiving compute nodes 112B-1 to 112B-4. Interfaces 118B-1 to 118B-4 receive and send write request packets 140 to memories 117B-1 to 117B-4 for writing at locations 130-1 to 130-4.

Figure 10B:
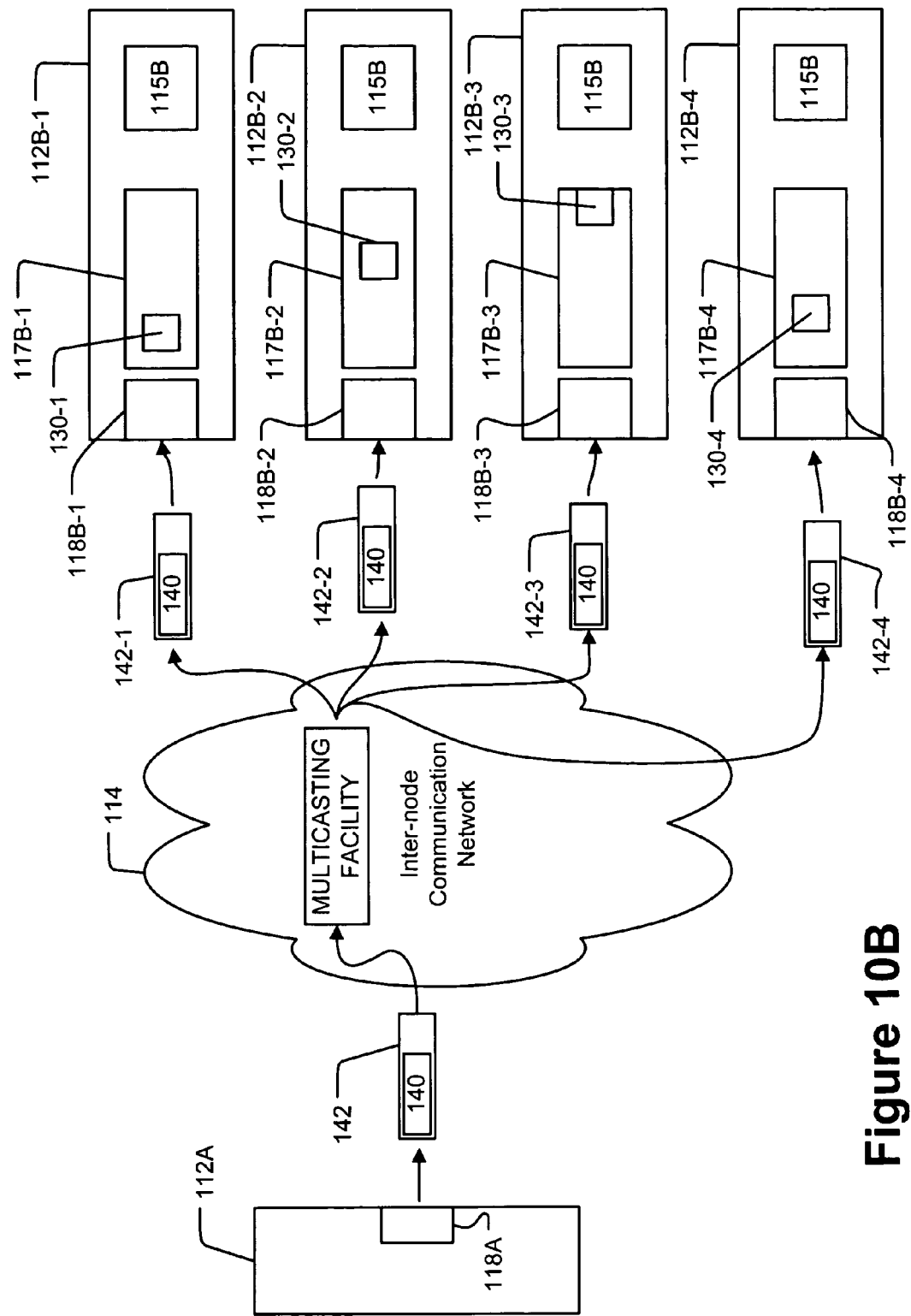
FIG. 10B is a schematic view of a computing system according to another embodiment of the invention wherein an address range in a sending compute node is mapped to memory regions in multiple receiving compute nodes.

In the alternative, if inter-node communication network 114 is configured to permit multicasting of packets, interface 118A could encapsulate each write request packet 140 in a single multicast packet 142. A multicasting facility of inter-node communication network 114 could then deliver a copy 142-1 to 142-4 of the packet to each intended receiving compute node 112B-1 to 112B-4 as shown in FIG. 10B.

The address ranges of memory locations 130 in the address spaces of receiving compute nodes 112B-1 to 112B-4 need not all be the same and may be different from one another. Interfaces 118B at the receiving compute nodes may each perform a different address translation for incoming write request messages. If sending interface 118A generates a separate inter-node communication network packet for each receiving node then address translation could be performed at sending interface 118A in the alternative.

Synchronization of communication between sending CPU 115A and receiving CPU 115B can be supported through the use of advanced packetized interconnect operations such as atomic read-modify-write. Any packetized interconnect packets can be tunneled between sending compute node 112A and receiving compute node 112B. This includes atomic read-modify-write packets. For example, CPU 115A could use a tunneled atomic read-modify-write packet to signal CPU 115B that a message has been sent to it. Tunneled atomic read-modify-write packets could be used by CPUs 115A and 115B to coordinate their usage of message buffers. Address translation of atomic read-modify-write packets can be handled in the same way as address translation of read requests and read responses.

The shared memory capabilities provided by embodiments of the invention may be used in contexts other than messaging. For example, a single copy of an operating system could run on CPUs 115A and 115B. Shared memory and atomic read-modify-write operations would allow the operating system to coordinate its operation and share critical data structures between the two CPUs.

This description has referred to packetized interconnect technology packets using names such as write request packets, write confirmation packets, read response packets, etc. These particular names are those used by HyperTransport™. Each packetized interconnect technology uses different names for its packets and has somewhat different packet formats. For example, write requests and read responses may be implemented in some technologies by multiple packets and in other technologies by single packets. Readers skilled in the art will recognize that other suitable packetized interconnect technologies, whether currently in use or developed in future could be used to carry packets within compute nodes 112.

Figure 11:
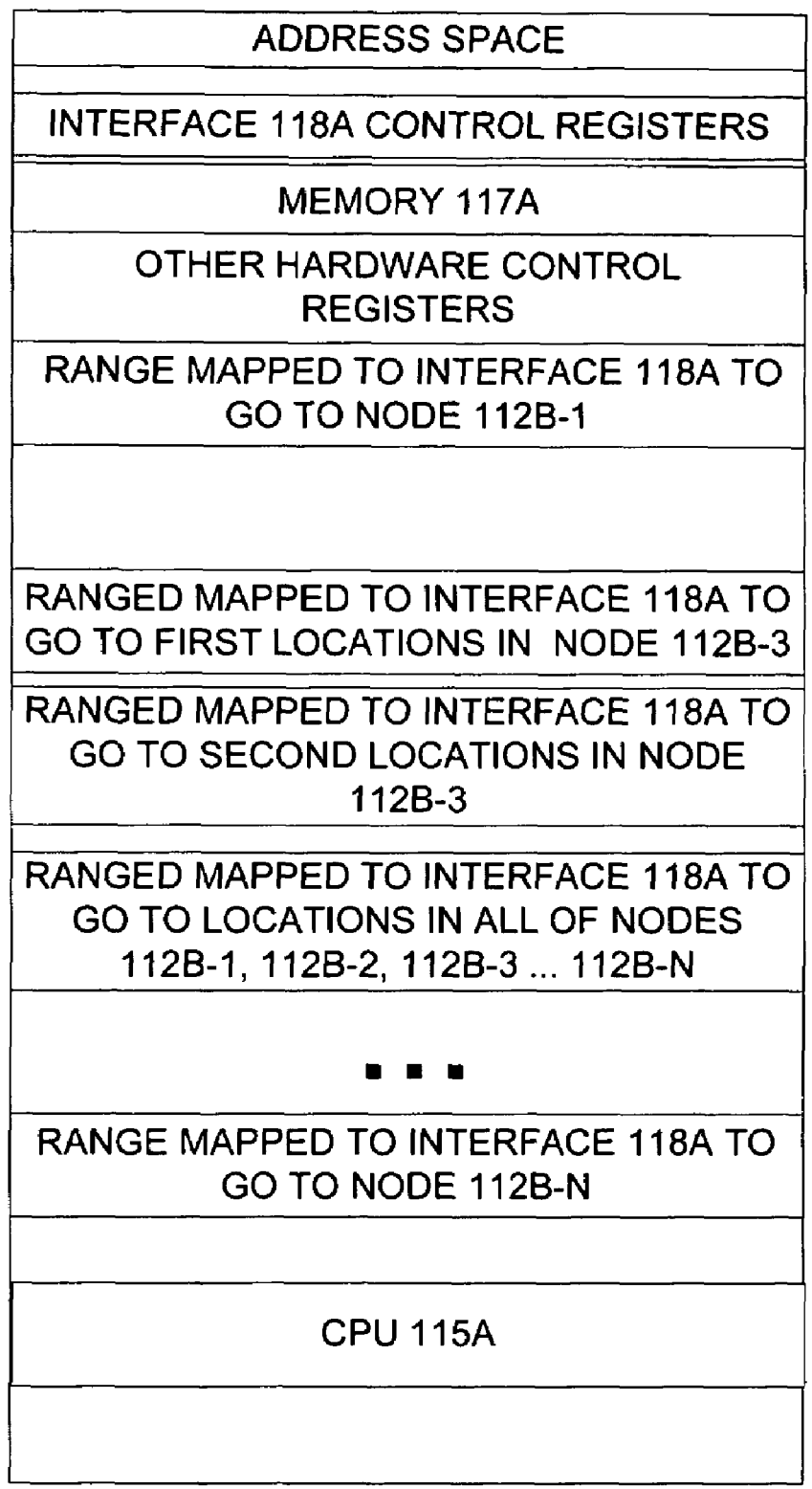
FIG. 11 is a partial schematic view of a possible allocation of address ranges for a local packetized interconnect of a compute node.

In computer systems according to typical implementations of the invention, each of a plurality of compute nodes maintain address ranges corresponding to memory regions in each of a plurality of other compute nodes. The compute nodes can write to or read from selected one(s) of the other compute nodes as described above. In some cases, every compute node of a computer system may maintain address ranges corresponding to every other compute node in the computer system. In other cases, compute nodes may maintain address ranges corresponding only to selected other compute nodes. For example, each compute node may maintain address ranges corresponding to other compute nodes which are at specific locations (e.g. nearest neighbors) in a desired topology such as a ring or a two or more dimensional mesh or toroid topology. Address range mappings in compute nodes of such a computer system may be mapped to other compute nodes under software control to permit intermediate results to be exchanged between compute nodes according to a topology applicable to an application executing on the computer system. FIG. 11 is an example of a partial memory mapping for a computer system illustrating a situation where a plurality of different address ranges in the address space used in a local packetized interconnect being configured to correspond to memory regions in a corresponding plurality of other compute nodes reached over an inter-compute node communication network 114.

Systems according to the invention may be implemented in hardware, in software or in some combination of hardware and software. Certain implementations of the invention comprise computer processors which execute software instructions which cause the processors to perform all or part of a method of the invention. For example, one or more processors in a computer system may execute software instructions in a program memory accessible to the processors in order to configure interfaces in the computer system to implement the methods of FIG. 3A or 9. The invention may also be provided in the form of a program product. The program product may comprise any medium which carries a set of computer-readable signals comprising instructions which, when executed by a computer processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

while the above description has referred to addresses within the address space of a first compute node being mapped to locations within a memory of a second compute node, the locations in the second compute node are not necessarily in a memory. The locations in the second compute node could be registers in any device which have addresses in the packetized interconnect of the second compute node.

While the above description has referred to a range within the address space of a first compute node being mapped to a corresponding region within a memory of a second compute node, the mapping may be established in such a way that the second compute node passes a memory region ID and size (instead of an address range) to the first compute node. The second compute node can associate the memory region ID with a range of addresses in its address space. The first compute node associates a first range of addresses in its address space with the memory region ID of the second compute node. The first compute node can tunnel a local packetized interconnect packet associated with an address in the first range to the second compute node and, in doing so can pass the memory region ID and an offset to the second compute node. The second compute node can translate the memory region ID and offset to a corresponding memory location. Using memory region IDs allows convenient substitution of memory regions in the second compute node.

The ranges of address space mapped according to the invention may be of any suitable size. The term range of addresses includes ranges which include only one address. The term range of addresses includes ranges which are not contiguous.

Tunneling the packetized interconnect packets could comprise rearranging the bits of the packetized interconnect packets as they travel over the inter-node communication network. The order in which the bits are represented in the inter-node communication network packet is of no consequence as long as the bits can be extracted to place a packetized interconnect packet on the local packetized interconnect of the receiving compute node.

Accordingly, the scope of the invention is to be construed in accordance with the substance defined by the following claims.

What is claimed is:

1. A method for exchanging data between compute nodes of a computer system comprising:

a plurality of compute nodes interconnected by an inter-node communication network each of the compute nodes operable to execute an application process, having an independent address space and comprising:

a local packetized interconnect, a network interface coupled to the local packetized interconnect and the inter-node communication network, at least one data processor coupled to the local packetized interconnect; and, a memory system accessible to the data processor;

the method comprising tunneling data from the sending compute node to the receiving compute node by:

placing a local packetized interconnect packet on the local packetized interconnect of the sending compute node;

at the network interface of the sending compute node receiving the local packetized interconnect packet and encapsulating the local packetized interconnect packet in an inter-node communication network packet addressed to the receiving compute node by placing the local packetized interconnect packet in a data payload of the inter-node communication network packet;

dispatching the inter-node communication network packet to the receiving compute node by way of the inter-node communication network;

at the network interface of the receiving compute node receiving the inter-node communication network packet and extracting the local packetized interconnect packet from the inter-node communication network packet; and, placing the extracted packet onto the local packetized interconnect of the receiving compute node; wherein, when the local packetized interconnect packet is on the local packetized interconnect of the sending compute node, portions of the local packetized interconnect packet other than any addresses and any check values are the same as the corresponding portions of the local packetized interconnect packet when the local packetized interconnect packet is on the local packetized interconnect of the receiving compute node.

2. A method according to claim 1 wherein a first range of addresses in the address space of the sending compute node is associated with the network interface of the sending compute node and, at the network interface of the sending compute node, the first range of addresses is associated with the receiving compute node, wherein the method comprises determining that the local packetized interconnect packet is addressed to an address in the first range of addresses upon receiving the local packetized interconnect packet at the network interface of the sending compute node and identifying the receiving compute node to which to address the inter-node communication packet in response to determining that the local packetized interconnect packet is addressed to the address in the first range of addresses.

3. A method according to claim 2 wherein the method comprises performing an address translation on the local packetized interconnect packet after receiving the packet at the network interface of the sending compute node and prior to placing the extracted packet onto the local packetized interconnect of the receiving compute node, the address translation comprising replacing the address of the local packetized interconnect packet in the address space of the sending compute node with a corresponding address in the address space of the receiving compute node.

4. A method according to claim 3 wherein the address translation is performed at the network interface of the sending compute node.

5. A method according to claim 4 comprising allocating a region of the memory of the receiving compute node to receive data from the sending compute node, memory locations in the allocated region being addressable by addresses in a second range of addresses corresponding to the first range of addresses, and communicating the second range of addresses from the receiving compute node to the sending compute node prior to tunneling the data from the sending compute node to the receiving compute node.

6. A method according to claim 5 comprising, at the sending compute node, prior to tunneling the data, computing an address transformation between the first and second address ranges and using the address transformation to perform the address translation.

7. A method according to claim 6 wherein the address transformation comprises an address translation table.

8. A method according to claim 5 wherein the first and second ranges of addresses are equal in size.

9. A method according to claim 3 wherein the address translation is performed at the network interface of the receiving compute node.

10. A method according to claim 1 wherein the local packetized interconnect packet comprises a write request packet comprising data to be written to a memory location in the memory system of the receiving compute node corresponding to an address of the local packetized interconnect packet in the address space of the sending compute node and the method comprises writing the data to the memory location in the receiving compute node.

11. A method according to claim 10 wherein the write request packet comprises a write confirmation request and the method comprises, detecting the write confirmation request at the network interface of the sending compute node, generating a write confirmation packet at the network interface of the sending compute node and dispatching the write confirmation packet on the local packetized interconnect of the sending compute node.

12. A method according to claim 11 comprising, at the network interface of the sending compute node, retaining a copy of the write request packet, maintaining a write completion timer and, if the write completion timer times out, using the copy of the write request packet to resend the write request packet to the receiving compute node by way of the inter-node communication network.

13. A method according to claim 10 wherein the write request packet comprises a write confirmation request and the method comprises:
    detecting the write confirmation request at the memory system of the receiving compute node,
    placing on the local packetized interconnect of the receiving compute node a write confirmation packet containing the address of the memory location in the address space of the receiving compute node;
    changing the write confirmation packet by altering the contained address of the memory location in the address space of the receiving compute node to a corresponding address in the first range of addresses; and,
    subsequently placing the write confirmation packet on the local packetized interconnect of the sending compute node.

14. A method according to claim 13 wherein changing the write confirmation packet is performed at the network interface of the sending compute node.

15. A method according to claim 13 wherein changing the write confirmation packet is performed at the network interface of the receiving compute node.

16. A method according to claim 10 wherein the write request packet comprises a write confirmation request and the method comprises, detecting the write confirmation request at the network interface of the receiving compute node, generating a write confirmation packet at the network interface of the receiving compute node and dispatching the write confirmation packet to the sending compute node.

17. A method according to claim 16 comprising, at the network interface of the receiving compute node, retaining a copy of the write request packet, maintaining a write completion timer and, if the write completion timer times out, using the copy of the write request packet to resend the write request packet to the memory system of the receiving compute node.

18. A method according to claim 1 wherein the local packetized interconnect packet comprises a read request packet.

19. A method according to claim 2 comprising, at the network interface of the sending compute node, associating the first range of addresses with each of a plurality of receiving compute nodes.

20. A method according to claim 19 comprising maintaining a correspondence between the first range of addresses and corresponding address ranges in address spaces of each of the plurality of receiving compute nodes.

21. A method according to claim 20 wherein the address ranges in the address spaces of the plurality of receiving compute nodes are not all the same.

22. A method according to claim 19 comprising dispatching the inter-node communication network packet to the plurality of receiving compute nodes by way of a multicast feature of the inter-node communication network.

23. A method according to claim 19 comprising, at the sending compute node, encapsulating each of a plurality of copies of the local packetized interconnect packet in a corresponding inter-node communication network packet addressed to a different one of the plurality of receiving compute nodes and dispatching each of the inter-node communication network packets to the corresponding receiving compute node by way of the inter-node communication network.

24. A method according to claim 2 comprising placing a plurality of local packetized interconnect packets addressed to one or more addresses in the first range of addresses on the local packetized interconnect of the sending compute node wherein encapsulating the packet in the inter-node communication network packet comprises encapsulating the plurality of local packetized interconnect packets in the same inter-node communication network packet.

25. A method according to claim 24 wherein the plurality of local packetized interconnect packets each comprise header information and a payload, at least some of the header information is the same for each of the local packetized interconnect packets and encapsulating the plurality of local packetized interconnect packets comprises placing into the inter-node communication network packet the payloads of all of the plurality of local packetized interconnect packets and the header information from fewer than all of the plurality of local packetized interconnect packets.

26. A method according to claim 1 wherein the sending and receiving compute nodes are peers.

27. A method according to claim 26 wherein the sending compute node has the same construction as the receiving compute node.

28. A method according to claim 1 wherein the local packetized interconnect packet comprises an atomic read-modify-write packet.

29. A method according to claim 1 wherein the local packetized interconnects of the compute nodes operate at data rates in excess of 300 MBps.

30. A method according to claim 29 wherein the inter-node communication network is characterized by a link data rate of at least 1 GBps.

31. A method according to claim 9 comprising, at the receiving compute node, altering a correspondence of the first range of addresses to addresses in the address space of the receiving compute node by changing the second range of addresses to a third range of addresses.

32. A method according to claim 1 wherein the packet placed on the local packetized interconnect of the sending compute node is a read response packet and the method comprises converting the read response packet into a write request packet.

33. A method according to claim 32 comprising issuing a read request directed to a location in the memory system of the sending compute node wherein, placing the packet on the local packetized interconnect of the sending compute node is performed by the memory system of the sending compute node in response to the read request.

34. A method according to claim 1 comprising allocating a memory ID to a range of addresses in an address space of the receiving compute node and associating a corresponding first range of addresses in an address space of the sending compute node with the memory ID and the receiving compute node; at the sending compute node, determining an offset from an address associated with the local packetized interconnect packet and the first range of addresses and passing the memory ID and the offset in the inter-node communication network packet to the receiving compute node.

35. A method according to claim 34 comprising, at the network interface of the receiving compute node, determining from the offset and memory ID a destination address in the range of addresses in the address space of the receiving compute node wherein placing the extracted packet onto the local packetized interconnect of the receiving compute node comprises addressing the extracted packet to the destination address.

36. A method according to claim 2 comprising establishing a reciprocal pathway for tunneling data packets from the receiving compute node to the sending compute node.

37. A method according to claim 1 comprising, at the network interface of the receiving compute node:
receiving a local packetized interconnect read request packet from the data processor of the receiving compute node addressed to an address in the address space of the receiving compute node in an address range corresponding to the sending compute node and,
in response thereto, encapsulating the read request packet, and forwarding the read request packet to the sending compute node by way of the inter-node communication network;
wherein the local packetized interconnect packet sent from the sending compute node to the receiving compute node is a read response packet generated in response to the read request packet.

38. A method performed in a multiprocessor computer system comprising:
a plurality of compute nodes interconnected by an inter-node communication network, each of the compute nodes having an independent address space, operable to execute an application process and comprising:
a local packetized interconnect,
a network interface coupled to the local packetized interconnect and the inter-node communication network,
at least one data processor coupled to the local packetized interconnect; and,
a memory system;
the method comprising:
at the network interface of a sending one of the compute nodes maintaining an association between a first range of addresses in an address space of the sending compute node and a receiving one of the compute nodes;
receiving on the local packetized interconnect of the sending compute node packets addressed to addresses in the first range of addresses;
in response to determining that the packets are addressed to addresses in the first range of addresses, encapsulating the packets in inter-node communication network packets addressed to the receiving compute node by placing the packets into data payloads of the inter-node communication network packets; and,
dispatching the inter-node communication network packets to the receiving compute node by way of the inter-node communication network.

39. A method according to claim 38 comprising:
at the network interface of the receiving compute node receiving the inter-node communication network packets and extracting the local packetized interconnect packets from the inter-node communication network packets; and,
placing the extracted local packetized interconnect packets onto the local packetized interconnect of the receiving compute node.

40. A method according to claim 39 comprising performing an address translation on the local packetized interconnect packet after receiving the packet at the network interface of the sending compute node and prior to placing the extracted packet onto the local packetized interconnect of the receiving compute node, the address translation comprising replacing an address of the local packetized interconnect packet in the address space of the sending compute node with an address in the address space of the receiving compute node.

41. A multiprocessor computer system comprising:
a plurality of compute nodes interconnected by an inter-node communication network, each of the compute nodes having an independent address space, operable to execute an application process and comprising:
a local packetized interconnect,
a network interface coupled to the local packetized interconnect and the inter-node communication network,
at least one data processor coupled to the local packetized interconnect; and,
a memory system;
wherein the network interface of a sending one of the compute nodes maintains an association between a first range of addresses in an address space of the sending compute node with a receiving one of the compute nodes and the network interface of the sending compute node is configured to: receive on the local packetized interconnect packets addressed to an address in the first range of addresses; encapsulate the packets in inter-node communication network packets addressed to the receiving compute node by placing the packets into data payloads of the inter-node communication network packets; and, dispatch the inter-node communication network packets to the receiving compute node by way of the inter-node communication network.

42. A multiprocessor computer system according to claim 41 wherein the network interface of the sending compute node includes an address translation facility operative to translate addresses of the packets into corresponding addresses in an address space of the receiving compute node prior to dispatching the inter-node communication network packets, the address translation facility operative to replace addresses of the packets in the address space of the sending compute node with corresponding address in the address space of the receiving compute node.

43. A network interface for use in a compute node of a multiprocessor computer system, the network interface comprising a facility for maintaining associations between one or more ranges of addresses in an address space of the compute node and corresponding other compute nodes and being constructed to: receive packets on a local packetized interconnect of the compute node, the packets addressed to addresses in the one or more ranges of addresses; encapsulate the packets in inter-node communication network packets by placing the packets into data payloads of the inter-node communication network packets and address the inter-node communication packets to the corresponding receiving compute nodes; and, dispatch the inter-node communication network packets to the corresponding receiving compute node by way of the inter-node communication network.

44. A network interface according to claim 43 comprising an address translation facility configured to edit the local packetized interconnect packets by changing addresses to which the packets are addressed from addresses in the one or more ranges of addresses to corresponding addresses in the address spaces of the corresponding receiving compute nodes prior to dispatching the inter-node communication network packets which encapsulate the local packetized interconnect packets.

* * * * *